(12) United States Patent
Handelsman et al.

(10) Patent No.: US 11,616,361 B2
(45) Date of Patent: Mar. 28, 2023

(54) ROUTING POWER IN A POWER SYSTEM

(71) Applicant: Solaredge Technologies Ltd., Herzeliya (IL)

(72) Inventors: Lior Handelsman, Givatayim (IL); Adrian Hawke, Lynwood (AU); Yoav Galin, Raanana (IL); Ilan Yoscovich, Ramat Gan (IL); Guy Sella, Bitan Aharon (IL); Tzachi Glovinsky, Petah-Tikva (IL); Yaron Binder, Shoham (IL); Liron Har-Shai, Tel Mond (IL); Guy Lichtenstern, Tel Aviv (IL); Izac Assia, Shoham (IL); Yaron Zolar, Kfar Saba (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/488,462

(22) Filed: Sep. 29, 2021

(65) Prior Publication Data

US 2022/0094171 A1    Mar. 24, 2022

Related U.S. Application Data

(63) Continuation of application No. 15/991,074, filed on May 29, 2018, now Pat. No. 11,171,491.
(Continued)

(51) Int. Cl.
*H02J 3/40* (2006.01)
*H02J 3/46* (2006.01)
(Continued)

(52) U.S. Cl.
CPC .............. *H02J 1/102* (2013.01); *H02J 3/38* (2013.01); *H02J 3/381* (2013.01); *H02J 3/40* (2013.01);
(Continued)

(58) Field of Classification Search
CPC ...... H02J 3/40; H02J 1/102; H02J 3/38; H02J 3/383; H02J 3/386; H02J 3/387;
(Continued)

(56) References Cited

U.S. PATENT DOCUMENTS

2010/0250018 A1    9/2010    Hauf et al.
2011/0025130 A1    2/2011    Hadar et al.
(Continued)

FOREIGN PATENT DOCUMENTS

| CN | 101800498 A | 8/2010 |
| CN | 102257450 A | 11/2011 |
| EP | 2372487 A2 | 10/2011 |

OTHER PUBLICATIONS

Jan. 19, 2023—CN Office Action—CN App No. 201810527743.2.

*Primary Examiner* — Toan T Vu
(74) *Attorney, Agent, or Firm* — Banner & Witcoff, Ltd.

(57) ABSTRACT

A power system comprising one or more power generators and a combiner. The system may be electrically connected to or include one or more loads. The combiner may have input terminals that are coupled to outputs of the power generators. The combiner may also have output terminals that are coupled to input(s) of the one or more loads. The power generators may be configured to transfer harvested power to the combiner, and the combiner may be configured to transfer the harvested power to the one or more loads.

10 Claims, 16 Drawing Sheets

Related U.S. Application Data

(60) Provisional application No. 62/512,325, filed on May 30, 2017.

(51) Int. Cl.
*H02J 3/38* (2006.01)
*H02J 1/10* (2006.01)

(52) U.S. Cl.
CPC .............. *H02J 3/46* (2013.01); *H02J 2300/24* (2020.01); *H02J 2300/26* (2020.01)

(58) Field of Classification Search
CPC .... H02J 3/46; H02J 3/385; H02J 3/381; H02J 2300/24; H02J 2300/26; H02J 3/24; H02J 13/00019; H02J 13/0075; Y02E 10/56; Y02E 10/76; Y02E 60/00; Y02E 60/7853; Y04S 40/126
See application file for complete search history.

(56) References Cited

U.S. PATENT DOCUMENTS

| | | |
|---|---|---|
| 2011/0084553 A1 | 4/2011 | Adest et al. |
| 2011/0241431 A1 | 10/2011 | Chen et al. |
| 2012/0044731 A1 | 2/2012 | Wirth |
| 2012/0068547 A1* | 3/2012 | Vermeersch .............. G05F 1/67 307/82 |
| 2013/0270915 A1 | 10/2013 | Park et al. |
| 2014/0001864 A1* | 1/2014 | Nirantare .......... H01L 31/02021 307/71 |
| 2016/0006250 A1 | 1/2016 | Ramond et al. |

* cited by examiner

ROUTING POWER IN A POWER SYSTEM

CROSS-REFERENCE TO RELATED APPLICATIONS

The present application is a continuation of U.S. Non-Provisional application Ser. No. 15/991,074, filed May 29, 2018, which claims priority to U.S. Provisional Patent Application Ser. No. 62/512,325, filed May 30, 2017, all of which are hereby incorporated by reference in their entireties.

BACKGROUND

Power generators, especially renewable power generators such as photovoltaic panels, may perform variably under varying conditions such as temperature, light exposure, weather conditions such as rain, snow, wind, etc. A power system may include a number of power generators of different types, such as wind turbines, photovoltaic panels, hydroelectric systems, etc. In some systems, power generators of different types and/or operating under different conditions may be connected to a common load. Because of the different types of power generators and/or the operation of power generators under different conditions, voltage and/or current mismatches may develop between the power generators. When combining the power generators to power a common load, there may be power loss due to the mismatches between the power generators.

SUMMARY

The following is a short summary of some of the inventive concepts for illustrative purposes only, is not intended to limit or constrain the inventions and examples in the detailed description, and is not intended to identify key or essential features. One skilled in the art will recognize other novel combinations and features from the detailed description.

In illustrative embodiments a power system may include a combiner and one or more power generators. The power system may also be electrically connected to or include one or more loads. The combiner's input terminals may be coupled to the outputs of the power generators. The combiner's output terminals may be coupled to the one or more loads' inputs. The power generators may be configured to transfer harvested power to the combiner, and the combiner may be configured to transfer the harvested power to the loads.

In illustrative embodiments there may be a power converter between the combiner and the load. The power converter may be configured to convert DC power or AC power, depending on the power generators and the load configured to receive the harvested power. The power converter may house and/or be electrically coupled to a power device. In some embodiments, the power device may perform power point tracking (PPT) on the power generators.

In illustrative embodiments, power devices may be positioned between the power generators and the combiner, such that the power generators' outputs may couple to the power devices' inputs, and the power devices' outputs may couple to the combiner's input terminals. The power devices may be configured to perform PPT on the power generators that are coupled to them. The combiner may be configured to match the different power device outputs in order to combine the power harvested from the number of power generators and transfer the power to a load or a power converter.

In illustrative embodiments, power devices may be coupled to different sections in one or more of the power generators. The power devices may be configured to convert the harvested power to an output power having a set or maximal value for an electrical parameter, for example, a set voltage or a set current. The power devices may be configured to perform PPT on their respective sections of the power generators.

In illustrative embodiments, the combiner may have multiple switches coupled to input terminals. The combiner may have a controller configured to control the state (e.g. ON, OFF) of the switches. The combiner may have multiple output terminals. The controller may be configured to change the state of the switches depending on electrical parameter values at one or more input terminals. The input terminals may be connected in parallel, in series or in a combination of both parallel and series. In some embodiments, the controller may determine to reduce power drawn from a power source, for example, by shorting or disconnecting one or more of the input terminals. The values of the electrical parameters (e.g. voltage, current, power) and thermal parameters (e.g. temperatures) at each one of the input terminals may be measured and provided to the controller by sensors placed at the input terminals to the combiner. The output terminals of the combiner may be connected to switches controlled by a controller. The controller may connect the output switches in series, parallel, a combination of both parallel and series configuration and/or short or disconnect one or more output terminals. The configuration may also depend on the values of the electrical parameters that the load or power converter are set to receive.

In illustrative embodiments, the power system may have a safety mechanism. In some embodiments, the safety mechanism may be configured to signal and/or communicate with the power converter. In some embodiments, the safety mechanism may be configured to signal and/or communicate with the combiner. The safety mechanism may be configured to send a first signal such as a "go into safe mode" signal. The "go into safe mode" signal may be sent using a power line communication (PLC) device, wireless communication device, acoustic communication device, cellular device, etc. In some embodiments, the safety mechanism may include a communication device configured to send a second signal, such as a "keep alive" signal, as long as system operating conditions enable continued and safe power production, and configured to cease sending the "keep alive" signal in the presence of one or more certain conditions, such as a potentially unsafe condition (e.g. excess voltage, current, power, temperature, etc.)

In some embodiments, the power system may be coupled to a user interface. The user interface may be configured to display values of parameters, such as electrical parameters in the power generators, power devices, the combiner, the power converter, and/or the load. The user interface may display different status reports of different components in the power system, for example: temperature, power supply parameters, and/or results of a comparison between parameters of the power generators. The user interface may be used to control components of the power system. This may allow, for example, a user to connect and/or disconnect the power devices and/or power converters, disconnect a certain power generator from the combiner, set an output voltage from the combiner, set an output current from the combiner, etc.

According to still further embodiments and aspects, a combiner may comprise a plurality of input terminals configured to receive power, a plurality of switches coupled to the plurality of input terminals and configured to electrically couple the plurality of input terminals, and a plurality of output terminals configured to output the power received by the plurality of input terminals. The combiner may further comprise, in any combination or subcombination, one or more of the following: a controller configured to switch the plurality of switches coupled to the plurality of input terminals; and/or switches coupled to the plurality of output terminals and configured to electrically couple the plurality of output terminals. The plurality of switches may be configured to electrically couple the plurality of input terminals in parallel and/or series. The plurality of input terminals may be configured to receive power from one or more power devices. The power devices may be coupled to a power generator. The power devices may be configured to receive power from one or more coupled power generator, and/or configured to find and apply an operating point for the power generator(s). The operating point may comprise setting a voltage and/or current of the power generator(s).

According to yet further embodiments and aspects, a system may comprise one or more power generators configured to output power, and a combiner that may comprise a plurality of input terminals and a plurality of output terminals. The plurality of input terminals may be configured to receive the power output from the one or more power generators and the plurality of output terminals may be configured to output the power. The system may be electrically connected to or include a load configured to receive the power output from the combiner. The system may further comprise, in any combination or subcombination, one or more of the following: one or more power devices, which may comprise a plurality of input terminals coupled to the one or more power generators, and a plurality of output terminals, and may be configured to convert power; a power converter coupled between the output of the combiner and the load; and/or a safety mechanism configured to signal the power converter and/or the combiner to go into "safe mode". The power converter may comprise a plurality of input terminals and a plurality of output terminals, wherein the plurality of input terminals to the power converter are configured to electrically couple to the output terminals of the combiner, and wherein the plurality of output terminals of the power converter are configured to electrically couple to the load. The "safe mode" may comprise lowering the voltage at the input of the power converter.

According to still further embodiments and aspects, a system may comprise a plurality of power generating devices that comprise a first group of power generating devices and a second group of power generating devices; one or more optimizers connected to the plurality of power generating devices; and a combining device connected to the one or more optimizers. The combining device may be configured as described in other embodiments and aspects herein and/or may comprise one or more processors, and memory storing machine readable instructions. When executed by the one or more processors, the instructions may cause the one or more processors to: measure, using one or more sensors, a parameter of the first group of power generating devices; measure, using the one or more sensors, a parameter of the second group of power generating devices; measure, using the one or more sensors, a combined parameter of the first group and the second group; and based on the parameter of the first group, the parameter of the second group, and the combined parameter, deactivate the first group of power generating devices, deactivate the second group of power generating devices, or deactivate the first group of power generating devices and the second group of power generating devices. The parameter of the first group may comprise a measured voltage, a measured temperature, a measured current, or a measured voltage on the first group. The parameter of the second group may comprise a measured voltage on the second group, and the combined parameter may comprise a measured voltage on the first group and the second group. The instructions may further cause the one or more processors to compare the parameter of the first group of power generating devices to a ground parameter or a neutral parameter. A method is further provided to perform the steps dictated by the machine-readable instructions.

According to still further embodiments and aspects, a system may comprise a plurality of power generating devices that comprise a first group of power generating devices and a second group of power generating devices; one or more optimizers connected to the plurality of power generating devices; and a combining device connected to the one or more optimizers. The combining device may be configured as described in other embodiments and aspects herein and/or may comprise one or more processors, and memory storing machine readable instructions. When executed by the one or more processors, the instructions may cause the one or more processors to measure, using one or more sensors, a parameter of the first group of power generating devices; measure, using the one or more sensors, a parameter of the second group of power generating devices; measure, using the one or more sensors, a combined parameter of the first group and the second group; and based on the parameter of the first group, the parameter of the second group, and the combined parameter of the first group and the second group, transmit an instruction, to the one or more optimizers, to control a voltage on the first group, control a voltage on the second group, or control a voltage on the first group and the second group. The instruction that is transmitted may comprise an instruction to modify the voltage or to prevent the voltage from rising. A method is further provided to perform the steps dictated by the machine-readable instructions.

According to still further embodiments and aspects, a system may comprise a plurality of power generating devices that comprise a first group of power generating devices and a second group of power generating devices; one or more optimizers connected to the plurality of power generating devices; and a combining device connected to the one or more optimizers. The combining device may be configured as described in other embodiments and aspects herein and/or may comprise one or more processors, and memory storing machine readable instructions. When executed by the one or more processors, the instructions may cause the one or more processors to measure, using one or more sensors, a parameter of the first group of power generating devices; measure, using the one or more sensors, a parameter of the second group of power generating devices; and based on the parameter of the first group and the parameter of the second group, deactivate the first group of power generating devices, deactivate the second group of power generating devices, or deactivate the first group of power generating devices and the second group of power generating devices. A method is further provided to perform the steps dictated by the machine-readable instructions.

Methods are described for electrically coupling the input terminals of the combiner in a preferred configuration. The input terminals to the combiner may be electrically coupled in series or in parallel, and in certain scenarios there may be a different configuration of coupling which may be more efficient with regard to the amount of power transferred to the outputs of the combiner. A method of electrically coupling the input terminals in a certain configuration may be carried out by a controller placed in the combiner or coupled to the combiner. The controller may differentiate between two or more scenarios, such as a first scenario and a second scenario. For example, the first scenario may be an output voltage on the output terminals of the combiner determined by a load or an inverter, and the second scenario may be where the output terminals voltage is not determined but rather dependent on the configuration of the input terminals to the combiner. In the first scenario, where the voltage on the output terminals is determined by a load or an inverter, the first step may include finding and/or setting an operating point for each one of the power generators coupled to the input terminals of the combiner.

In the first scenario and in the second scenario the next step may be matching voltages and/or currents between the input terminals of the combiner. Matching voltages and currents may include connecting certain input terminals with similar current values in series, and connecting certain input terminals in parallel with even voltage values.

The method of matching voltages and currents may include the following steps. At an initial stage, the controller may determine that there are "n" pairs of inputs to the combiner, coupled to power generators. The controller may divide the "n" pairs into "k" groups of inputs. Each group of the "k" groups that has more than "k" inputs is divided into "m" sub-groups. This step is repeated until each group and sub-group has "k" or less pairs of inputs. The next step may include selecting a connectivity configuration for each one of the "k" or less pairs of inputs, and electrically coupling the "k" or less input pairs together according to the selected configuration. After the pairs of inputs of the sub-groups are connected, the next step may include selecting a connectivity configuration of the sub-groups and groups and electrically coupling them accordingly. When all inputs, sub-groups and groups are electrically coupled, the matching of the voltage and current is finished.

The method of selecting a connectivity configuration and electrically coupling input terminals, or groups of input terminals may include several steps. The first step may include electrically coupling the input terminals or groups of input terminals in parallel and measuring the values of the combined electrical parameters (e.g. voltage and current). A step may include electrically coupling the input terminals or groups of input terminals in series and measuring the values of the combined electrical parameters. After the measurements of both configurations are available, the controller may compare the measurements and, at a later step, the controller may electrically couple the input terminals or groups of input terminals according the comparison of the measurements.

According to still further embodiments and aspects, methods are described that comprise receiving power from one or more power generators, transferring the received power from a plurality of inputs to a plurality of outputs, and outputting the power to a load. The methods may further comprise various steps in any combination or subcombination, such as sensing electrical parameters at the plurality of input terminals; electrically coupling the plurality of input terminals in a parallel configuration, series configuration and/or a combined configuration; shorting one or more of the plurality of input terminals; and/or receiving a go into "safe mode" signal, where the "safe mode" may comprise, for example, disconnecting one or more of the plurality of input terminals and/out output terminals.

Systems and apparatuses are also described for performing all of the above methods and other methods.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized and structural and functional modifications may be made, without departing from the scope of the present disclosure.

Figure 1:
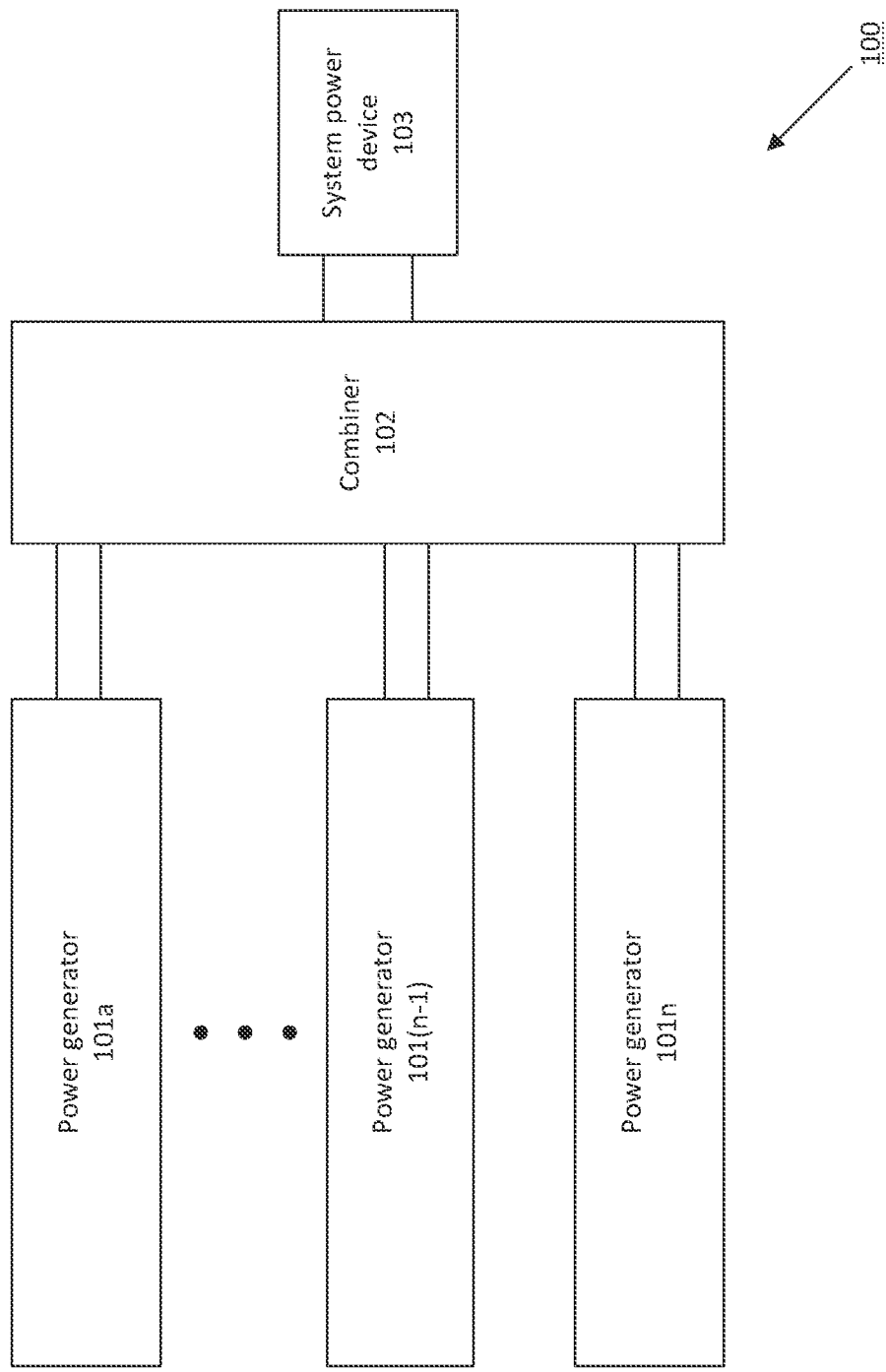
FIG. 1 is a part schematic, part block-diagram, of an example power system configuration, according to various aspects of the present disclosure.

Reference is now made to FIG. 1, which shows a power system 100 according to illustrative embodiments. Power system 100 may comprise one or more power generators 101a-101n, where each power generator of power generators 101a-101n may be a photovoltaic (PV) generator, wind turbine, hydro-turbine, fuel cell, battery, and/or supercapacitor, used as a power source. In some embodiments, where power generators 101a-101n are PV generators, power generators 101a-101n may be a PV cell, a string of PV cells connected in a parallel configuration, a string of PV cells connected in a series configuration, a string of PV cells connected in a combination of parallel and series configuration ("combination of parallel and series configuration" is referred to herein as a "combined configuration"), one or more substrings of PV cells, a photovoltaic panel, a string of photovoltaic panels in a parallel configuration, a string of photovoltaic panels in a series configuration, and/or a string of photovoltaic panels in a combined configuration. Power system 100 may comprise a system power device 103.

In some embodiments, system power device 103 may comprise a DC/AC inverter and may output alternating current (AC) power to an electrical grid, where the electrical grid may be a network for delivering electricity from a supplier to a consumer, a home, or other destinations. In some embodiments, system power device 103 may comprise a combiner box, transformer and/or safety disconnect circuit. For example, system power device 103 may comprise a DC combiner box for receiving DC power from a plurality of power generating strings and outputting the combined DC power. In some embodiments, system power device 103 may comprise a fuse coupled to each string for overcurrent protection, and/or one or more disconnect switches for disconnecting one or more power generating strings. In some embodiments, system power device 103 may comprise or be coupled to a control device and/or a communication device for controlling or communicating with PV power devices (such as power devices 202a-n of FIG. 2). For example, system power device 103 may comprise a control device such as a microprocessor, Digital Signal Processor (DSP) and/or a Field Programmable Gate Array (FPGA) configured to control the operation of system power device 103. System power device 103 may further comprise a communication device (e.g. a Power Line Communication circuit and/or a wireless transceiver) configured to communicate with linked communication devices included in PV power devices. In some embodiments, system power device 103 may comprise both a control device and a communication device, the control device configured to determine desirable modes of operation for PV power devices (e.g. power devices 202 of FIG. 2), and the communication device configured to transmit operational commands and receive reports from communication devices included in the PV power devices.

System power device 103 may be a DC/DC power converter and/or a DC/AC power converter. In some embodiments, system power device 103 may apply power point tracking (PPT) to power generators 101a-101n. PPT may include determining and applying an operating point best fit for the power system 100. An operating point includes setting a parameter such as a voltage and/or a current on one or more, or even all, of power generators 101a-101n. An operating point best fit for power system 100 may include harvesting maximum power from power generators 101a-101n, harvesting maximum power that system power device 103 is able to convert, etc. PPT may be done, for example, using various methods such as "perturb and observe", impedance matching and/or lookup tables. Lookup tables may be indexed according to various parameters, for example, voltage, current, and/or temperature. For example, for a given temperature, a lookup table may indicate a voltage and/or current best fit for power system 100. Another example for PPT may be dynamic PPT. Dynamic PPT may include "perturb and observe" or an impedance matching method. For example dynamic PPT may comprise changing the voltage and/or current, sensing and measuring the respective current and/or voltage and, according to the power value of both the set voltage and/or current and the measured current and/or voltage, choosing a power point fit for power system 100. System power device 103 may comprise a DC/DC converter and/or a DC/AC converter. Where system power device 103 comprises both a DC/DC converter and a DC/AC converter, system power device 103 may be configured to convert DC to DC before converting DC to AC. For example, system power device 103 may set a voltage of V=400 $V_{DC}$ (e.g., for drawing increased or maximum power from power generators 101a-101n) at the input of system power device 103, and system power device 103 may be configured to convert DC power to AC power at a voltage of V=700 $V_{DC}$. For example, system power device 103 may convert power with a DC voltage of 400 $V_{DC}$ to power with a DC voltage of 700 $V_{DC}$ before converting DC power to AC power.

In some embodiments, power system 100 may comprise a combiner 102. Power system 100 may have more output terminals from power generators 101a-101n than input terminals to system power device 103. Combiner 102 may be an intermediary between power generators 101a-101n and system power device 103 by electrically coupling power generators 101a-101n at the input to the combiner 102, and outputting power received from power generators 101a-101n to system power device 103 through output terminals of the combiner 102, which may correspond to the number of inputs to system power device 103. Combiner 102 may electrically couple power generators 101a-101n in parallel, in series or in a combined configuration. For example, power converter 103 may have two input terminals, while power system 100 may have six power generators 101a-101f wherein each one of power generators 101a-101f may have a pair of output terminals. Combiner 102 may electrically couple power generators 101a-101f in series, parallel or a combined configuration, and output the power via two output terminals. Combiner 102, or any portion thereof, may be placed independently in power system 100 or may be housed in or mounted on system power device 103. For example, portions of the combiner 102 may be separate from the system power device 103, and portions of the combiner 102 may be integrated in, housed in, or mounted on system power device 103.

Figure 2:
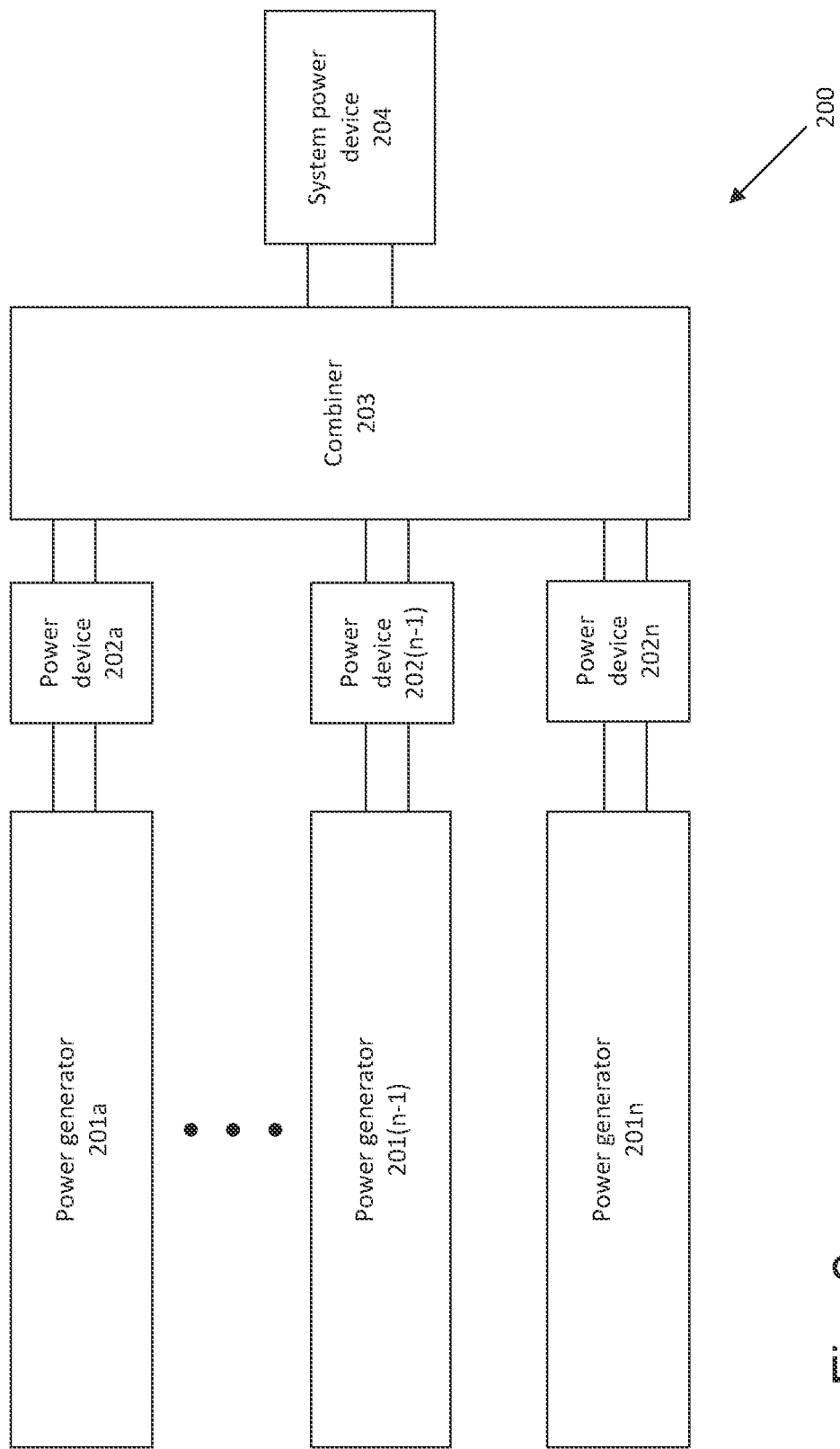
FIG. 2 is a part schematic, part block-diagram, of an example power system configuration including power devices between power generators and a combiner, according to various aspects of the present disclosure.

Reference is now made to FIG. 2 which illustrates a power system 200 according to illustrative embodiments. Power system 200 may comprise power generators 201a-201n, which may be the same or similar to power generators 101a-101n of FIG. 1. Power system 200 may comprise system power device 204, which may comprise a DC/AC power converter and/or DC/DC power converter. Power devices 202a-202n may be coupled to one or more of power generators 201a-201n. Power devices 202a-202n may comprise a DC/DC power converter and/or a DC/AC power converter. Power devices 202a-202n may perform PPT on corresponding power generators of power generators 201a-201n coupled to power devices 202a-202n. For example, power device 202a may be coupled to power generator 201a, and power device 202a may perform PPT on power generator 201a. In another example, power device 202a may be coupled to two or more power generators, and may perform PPT on the two or more power generators. Power system 200 may comprise a combiner 203. Combiner 203 may be the same or similar to combiner 102 of FIG. 1. Combiner 203 may have one or more input terminals, which may be configured to electrically couple to power devices 202a-202n and/or power generators 201a-201n. Power devices 202a-202n may be configured to output power with the same voltage and/or current level as each of the other power devices 202a-202n. Combiner 203 may electrically couple the input terminals coupled to power devices 202a-202n in series, parallel or a combined configuration. Combiner 203 may be configured to output the power received from power generators 201a-201n, via the power devices 202a-202n, to system power device 204.

Figure 2A:
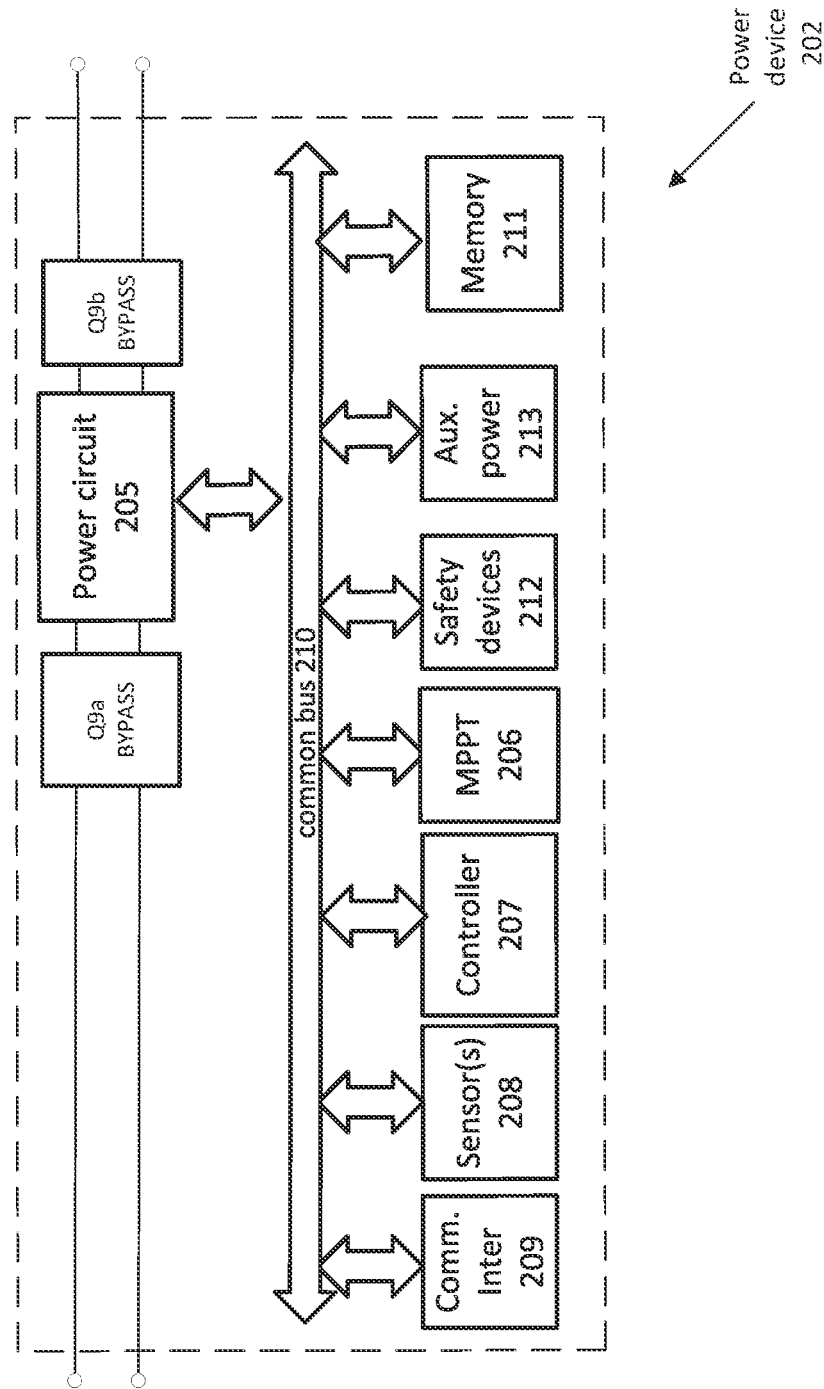
FIG. 2A is a block diagram of an example power device, according to various aspects of the present disclosure.

Reference is now made to FIG. 2A, which illustrates circuitry that may be found in a power device such as power device 202, according to an illustrative embodiment. Power module 202 may be similar to or the same as power devices 202a-202n shown in FIG. 2A. In some embodiments, power device 202 may comprise power circuit 205. Power circuit 205 may comprise a direct current to direct current (DC/DC) converter, such as a Buck, Boost, Buck/Boost, Buck+Boost, Cuk, Flyback, and/or forward converter. In some embodiments, power circuit 205 may comprise a direct current to alternating current (DC/AC) converter (also known as an inverter), such as a micro-inverter. Power circuit 205 may have two input terminals and two output terminals, which may be the same as the input terminals and output terminals of power device 202. In some embodiments, the two input terminals of power device 202 may be directly coupled to the two output terminals of power device 202, so that power device 202 functions without power conversion (i.e. power circuit 205 might not be included in the system or might not perform power conversion). In some embodiments, power circuit 205 may comprise a switch to disconnect the input terminals from the output terminals. In some embodiments, power device 202 may comprise Maximum Power Point Tracking (MPPT) circuit 206, which may be configured to extract increased power from a power source the power device 202 is coupled to. In some embodiments, power circuit 205 may comprise MPPT functionality. In some embodiments, MPPT circuit 206 may implement impedance matching algorithms to extract increased power from a power source the power device 202 is coupled to. Power device 202 may further comprise controller 207 which may be a microprocessor, Digital Signal Processor (DSP), Application-Specific Integrated Circuit (ASIC) and/or a Field Programmable Gate Array (FPGA).

Referring still to FIG. 2A, controller 207 may control and/or communicate with other elements of power device 202 over common bus 210. In some embodiments, power device 202 may comprise circuitry and/or sensors/sensor interfaces 208 configured to measure one or more parameters directly or receive one or more measured parameters from connected sensor(s) and/or sensor interface(s) configured to measure one or more parameters that may be, for example, on or near the power source. The sensors 208 may measure, among other parameters, the voltage and/or current output by the power source, and/or the power output by the power source. In some embodiments, the power source may be a photovoltaic (PV) generator comprising PV cells, and a sensor unit (e.g., one or more sensors and/or sensor interfaces 208) may directly measure or receive measurements of the irradiance received by the PV cells, and/or the temperature on or near the PV generator.

Referring still to FIG. 2A, in some embodiments power device 202 may comprise communication interface 209, which may be configured to transmit and/or receive data and/or commands to/from other devices. Communication interface 209 may communicate using Power Line Communication (PLC) technology, which may enable data transmission over existing power cables. Communication interface 209 may communicate using wireless technologies such as ZigBee™, Wi-Fi, cellular communication, or other wireless methods. Communication interface 209 may also comprise a means for opto-electronic communication, which may comprise optical fibers to convey data and/or commands from other devices.

In some embodiments, power device 202 may comprise memory device 211, which may comprise one or more physical memories such as memory chips. The memory device 211 may store measurements taken by sensor(s)/sensor interfaces 208. The memory device 211 may store code, operational protocols or other operating information. Memory device 211 may be or otherwise include Flash, Electrically Erasable Programmable Read-Only Memory (EEPROM), Random Access Memory (RAM), Solid State Devices (SSD), and/or other types of appropriate memory devices.

Referring still to FIG. 2A, in some embodiments, power device 202 may comprise one or more safety devices 212 (e.g. fuses, circuit breakers and Residual Current Detectors). Safety devices 212 may each be passive or active. For example, safety devices 212 may comprise one or more passive fuses disposed within power device 202. The one or more passive fuses may be designed to melt when a certain amount of current flows through a fuse, which may cause part of power device 202 to disconnect, thereby limiting damage to the power device 202. In some embodiments, safety devices 212 may comprise active disconnect switches, which may be configured to receive commands from a controller (e.g. controller 207, or an external controller) to disconnect portions of power device 202. The active disconnect switches may be configured to disconnect portions of power device 202 in response to a measurement measured by a sensor (e.g. a measurement measured or obtained by sensors/sensor interfaces 208). In some embodiments, power device 202 may comprise auxiliary power circuit 213, which may be configured to receive power from a power source coupled to power device 202, and output power suitable for operating other circuitry components (e.g., controller 207, communication interface 209, etc.). Communication, electrical coupling and/or data-sharing between the various components of power device 202 may be carried out over common bus 210.

Referring still to FIG. 2A, in some embodiments, power device 202 may comprise one or more bypass units Q9a and/or Q9b, which may be coupled between the inputs of power circuit 205 and/or between the outputs of power circuit 205. Bypass units Q9a-b and/or power circuit 205 may be or otherwise include a junction box to terminate power lines or to provide a safety feature such as fuses or residual current devices. Bypass units Q9a-b may also be isolation switches, for example. Bypass units Q9a-b may be controlled by controller 207. If an unsafe condition is detected, controller 207 may set bypass unit Q9a and/or bypass unit Q9b to ON, thereby short-circuiting the input and/or output of power circuit 205. In a case in which a power generators 201a-201n are photovoltaic (PV) generators, each PV generator may have an open-circuit voltage at the generator output terminals. When bypass unit Q9a is ON, a PV generator may be short-circuited, to provide a voltage of approximately zero to power circuit 205. Bypass Units Q9a-b may be operated to maintain a safe voltage at the output terminals of power device 202. For example, bypass unit Q9b may short-circuit the output terminals, to provide an output voltage of about 0V, while bypass unit Q9a may be OFF, allowing a PV generator to maintain a generator output voltage which may be provided to auxiliary power circuit 213. This mode of operation may allow continuous power supply to system control devices, as well as provide backup mechanisms for maintaining a safe voltage.

Sensor(s) 208, which may be operatively attached to controller 207, may comprise analog to digital converters (not shown) that may be connected to the sensors. The sensors may be configured to detect electrical parameters, such as current, of power device 202. The sensors may be configured to detect electrical parameters of power circuit 205 and power generators 201a-201n. Sensor/sensor interface 208 may comprise an energy gauge to count coulombs (amperes per second), for example when either charging or discharging a battery. The sensors may be located and/or integrated inside power circuit 205. The sensors may be spatially located in the vicinity of power device 202. Similarly, a sensor may be spatially located in the vicinity of power generators 201a-201n. Additional sensors may be added and configured to sense, for example, temperature, humidity, and/or luminance.

Figure 3:
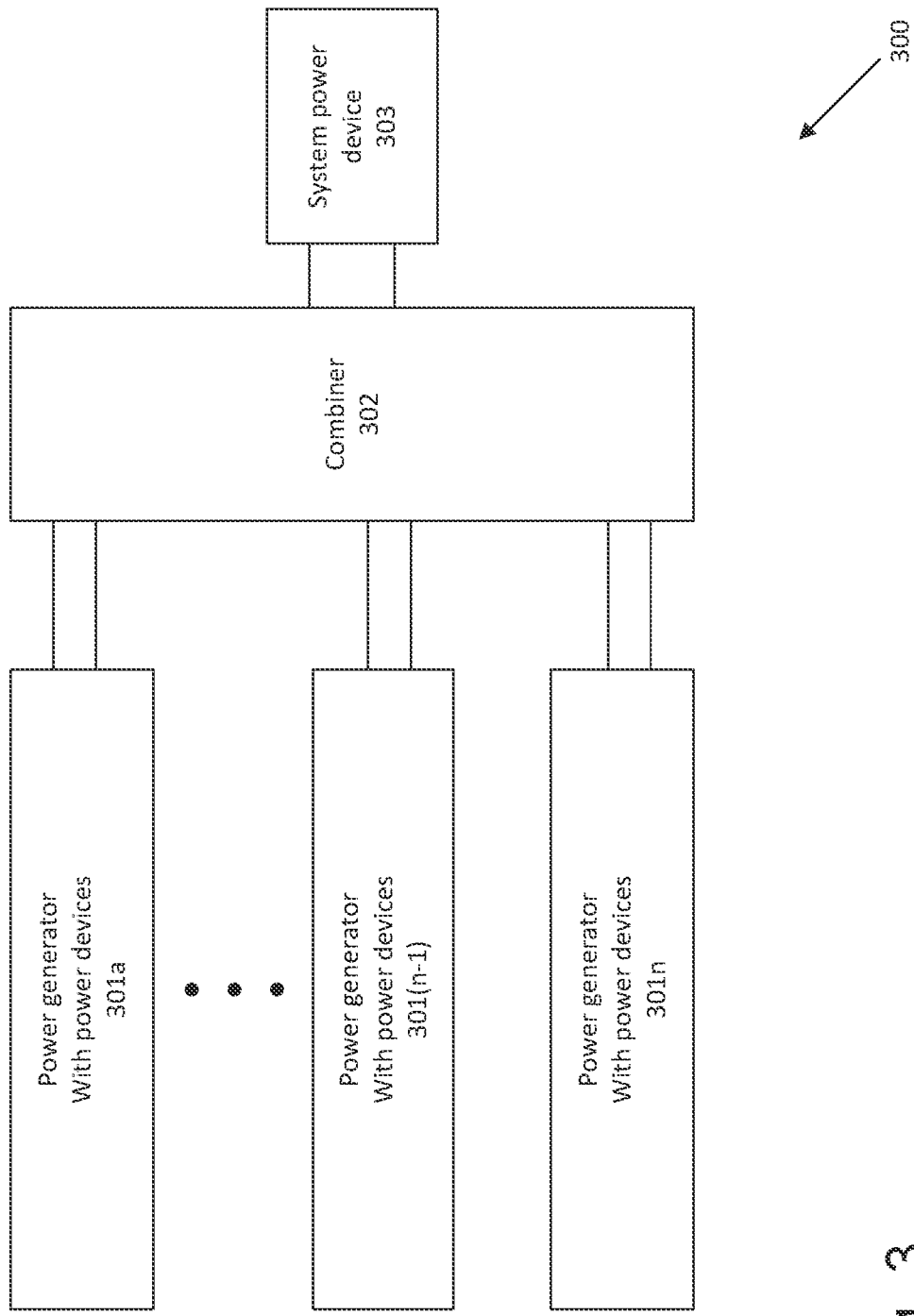
FIG. 3 is a part schematic, part block-diagram of an example power system configuration including power devices coupled to or incorporated within power generators, according to various aspects of the present disclosure.

Reference is now made to FIG. 3, which illustrates a power system 300 according to illustrative embodiments. Power system 300 may comprise power generators 301a-301n which may be the same or similar to power generators 101a-101n of FIG. 1. Power generators 301a-301n may output power to a combiner 302. Combiner 302 may transfer the output power from power generators 301a-301n to a system power device 303. System power device 303 may have one or more input terminals coupled to one or more output terminals of combiner 302. In some embodiments, some or all parts of power generators 301a-301n may be coupled to power devices, and the power devices may be configured to perform PPT and determine a preferred operating point of the corresponding power generators 301a-301n. Power devices coupled to power generator parts of power generators 301a-301n may output harvested power at a certain voltage and/or current level. Combiner 302 may receive power from power generators 301a-301n and, depending on the voltage and current levels at the pairs of input terminals of combiner 302, may electrically couple the pairs of input terminals to combiner 203 in a series configuration, parallel configuration, or a combined configuration.

Figure 4:
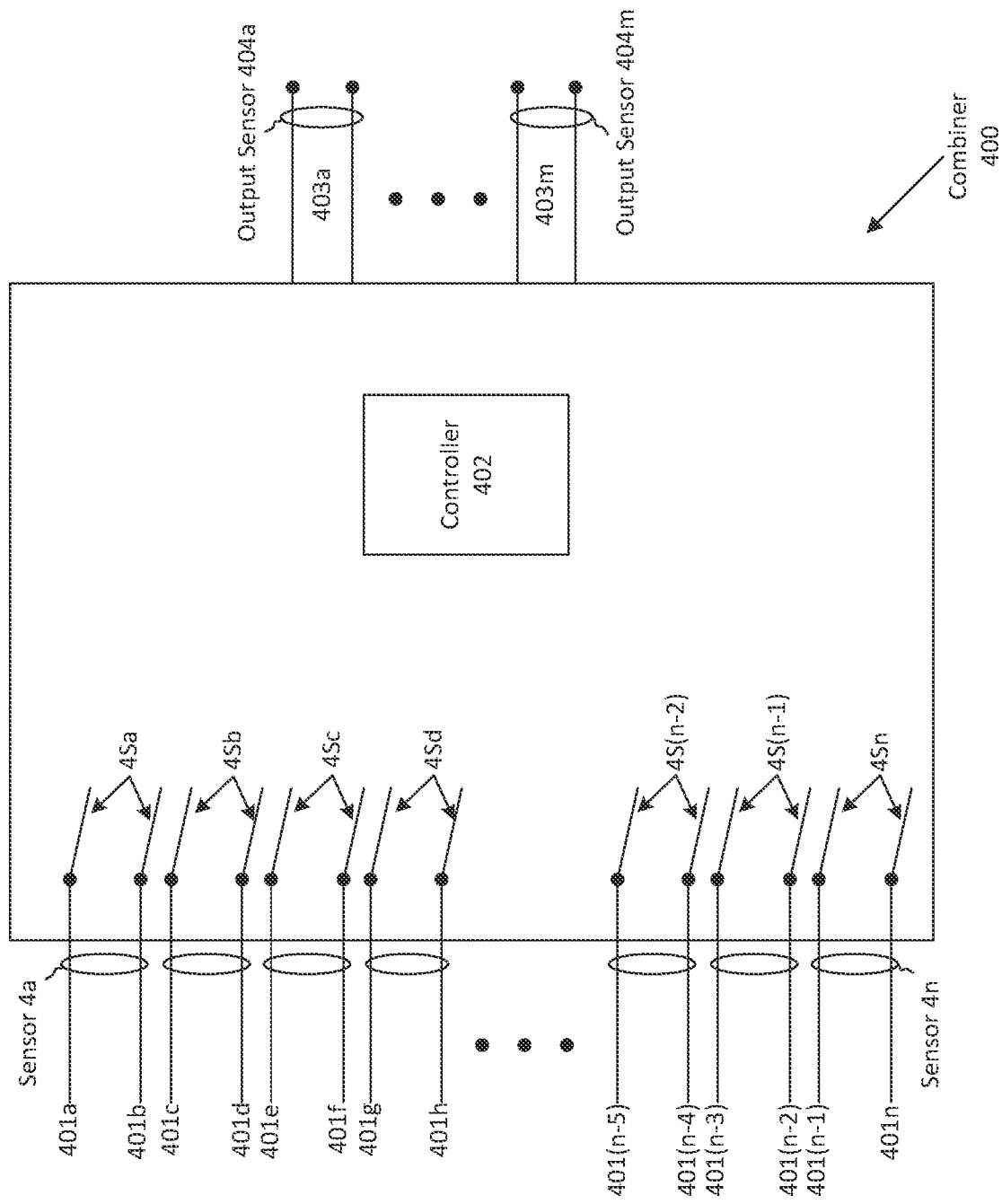
FIG. 4 is a part schematic, part block-diagram, of an example combiner including sensors coupled to the input terminals as well as the output terminals, according to various aspects of the present disclosure.

Reference is now made to FIG. 4, which illustrates a combiner 400 according to illustrative embodiments. Combiner 400 may have input terminals 401a-401n coupled to switches 4Sa-4Sn. Switches 4Sa-4Sn may comprise, for example, one or more of the following: a metal-oxide-semiconductor field-effect transistor (MOSFET), an insulated-gate bipolar transistor (IGBT), a Bipolar Junction Transistor (BJT), and/or relay switches. One or more of input terminals 401a-401n may be electrically coupled to a power source such as power generators 101a-101n of FIG. 1. Combiner 400 may comprise a controller 402, which may be configured to operate switches 4Sa-4Sn. Controller 402 may be, for example, a digital signal processor (DSP), microcontroller unit (MCU), a field-programmable gate array (FPGA), an application-specific integrated circuit (ASIC), an analog control circuit, etc. Combiner 400 may output power at output terminals 403a-403m. In some embodiments, output terminals 403a-403m may output power to one or more power converters. For example, combiner 400 may output power to three power converters, each power converter having a pair of input terminals, and correspondingly, combiner 400 may have six output terminals 403a-403f. Output terminals 403a-403m may be electrically coupled in a parallel, series or a combined (e.g. series and parallel) configuration. In some embodiments, controller 402 may electrically couple one or more of input terminals 401a-401d to one or more of output terminals 403a-403m and may short one or more of input terminals 401a-401n.

In some embodiments, combiner 400 may have sensors/sensor interfaces 4a-4n, configured to sense electrical parameters of power flowing through input terminals 401a-401n. Sensors/sensor interfaces 4a-4n may be configured to sense one or more parameters, for example, voltage, current, heat and connection status of the power generators to input terminals 401a-401n. In some embodiments sensors/sensor interfaces 4a-4n may sense parameters on input terminals 401a-401n in relation or compared to a ground or neutral reference point, or between two input terminals (e.g. voltage between input terminal 401a and input terminal 401g). Sensors/sensor interfaces 4a-4n may be coupled to controller 402 and controller 402 may be configured to receive values sensed by sensors/sensor interfaces 4a-4n. In some embodiments, output terminals 403a-403m may be coupled with output sensors/sensor interfaces 404a-404m. Output sensors/sensor interfaces 404a-404m may be the same or similar to sensors/sensor interfaces 4a-4n. Controller 402 may be configured to open and close switches 4Sa-4Sn according to values sensed by sensors/sensor interfaces 4a-4n and/or output sensors/sensor interfaces 404a-404m. Depending on the operation of switches 4Sa-4Sn at input terminals 401a-401n, and the electrical configuration of input terminals 401a-401n, combiner 400 may transfer power from input terminals 401a-401n to output terminals 403a-403m.

Figure 4A:
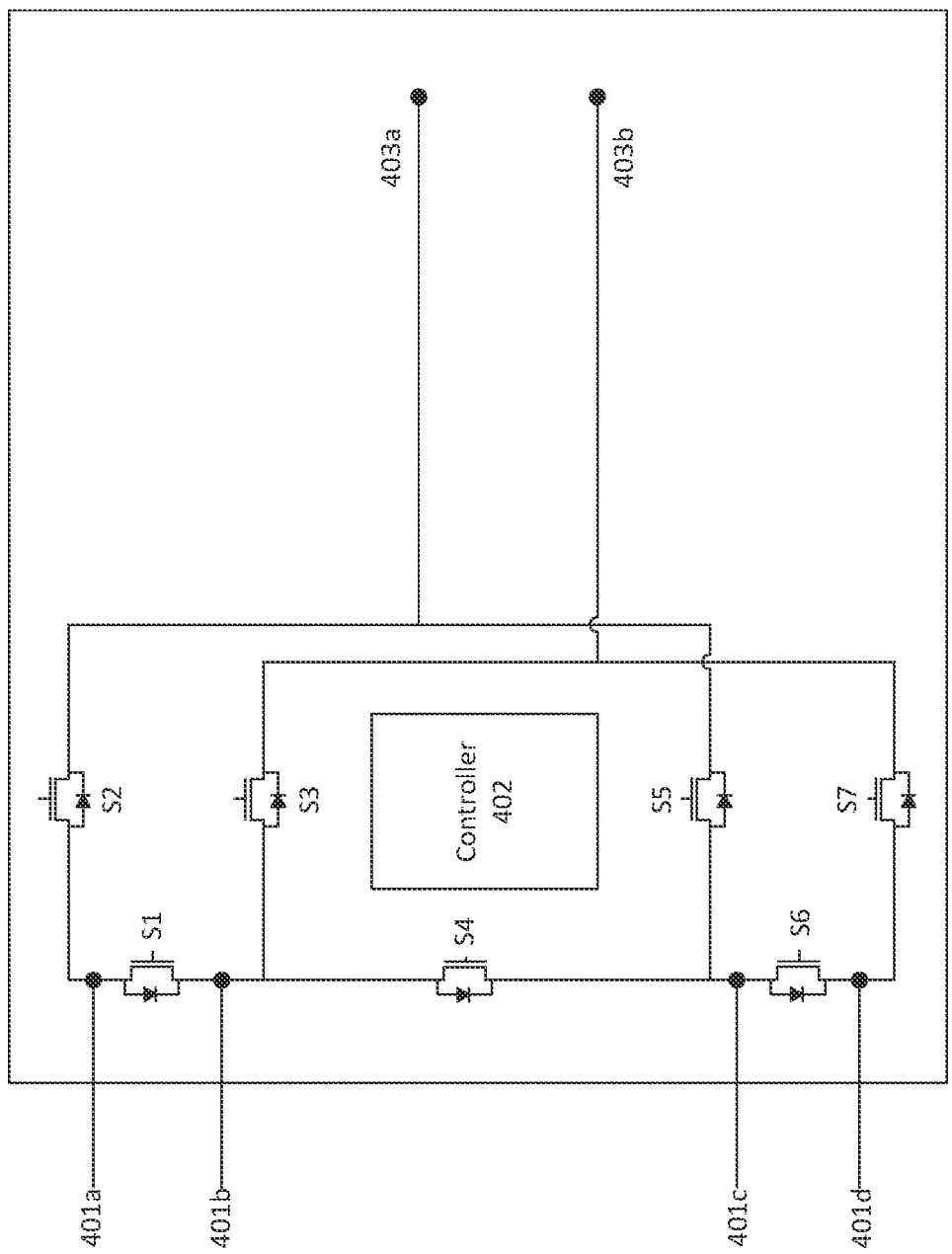
FIG. 4A is a part schematic, part block diagram, of an example combiner including switches configured to electrically couple or uncouple input terminals of the combiner and couple input terminals to output terminals of the combiner, according to various aspects of the present disclosure.

Reference is now made to FIG. 4A, which shows an example of an implementation of combiner 400 according to illustrative embodiments. Combiner 400 may comprise input terminals 401a-401d coupled to power generators. Switches S1-S7 may be MOSFETs coupled to controller 402, where controller 402 may be coupled to the gates of switches S1-S7 and configured to control switches S1-S7. In an embodiment where switches S2, S4 and S7 are ON and switches S1, S3, S5 and S6 are OFF, input terminals 401a-

401d may be electrically coupled in a series configuration, and power may transfer from input terminals 401a-401d to output terminals 403a-403b. In an embodiment where switches S2, S3, S5 and S7 are ON and switches S1, S4 and S6 are OFF, input terminals 401a-401d may be electrically coupled in a parallel configuration, and power may transfer from input terminals 401a-401d to output terminals 403a-403b. In an embodiment where switches S1 and S6 are ON, input terminals 401a-401d may be shorted, and power might not transfer from input terminals 401a-401d to any of the output terminals 403a-403b. In an embodiment where switches S1-S7 are OFF, input terminals 401a-401d may be uncoupled from combiner 400, and power might not transfer from input terminals 401a-401d to output terminals 403a-403b.

Figure 5A:
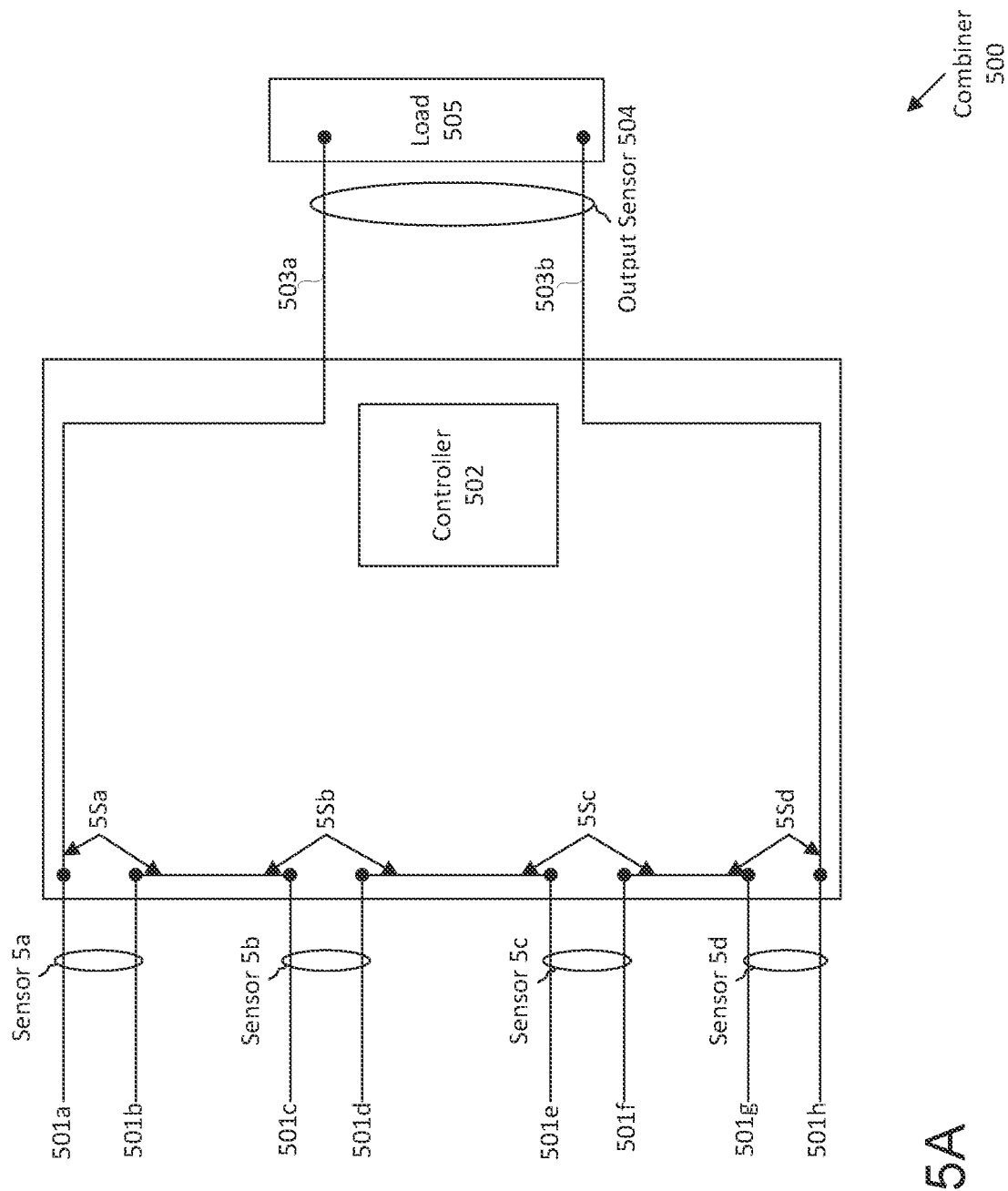
FIG. 5A is a part schematic, part block-diagram, of an example combiner and its input terminals electrically coupled in a series configuration, according to various aspects of the present disclosure.

Reference is now made to FIG. 5A, which shows a combiner 500 in a first mode of operation according to illustrative embodiments. Combiner 500 may be the same or similar to combiner 400 of FIG. 4 and components of combiner 500 (e.g. input terminals 501a-501h, sensors/sensor interfaces 5a-5d, controller 502, output terminals 503a-503b and output sensor(s)/sensor interface(s) 504) may be the same or similar to corresponding components of combiner 400 (e.g. input terminals 401a-401n, sensors/sensor interfaces 4a-4n, controller 402, output terminals 403a-403m and output sensor(s)/sensor interface(s) 404a). In some embodiments, combiner 500 may comprise input terminals 501a-501h. Each sensor/sensor interface of sensors/sensor interfaces 5a-5d may be coupled to one or more of input terminals 501a-501h. Sensors/sensor interfaces 5a-5d may sense the voltage on input terminals 501a-501h. Combiner 500 may comprise two or more output terminals 503a-503b electrically coupled to a load 505. Output sensor/sensor interface 504 may sense the voltage, and/or other parameters, on output terminals 503a-503b. In some embodiments, the output voltage may be determined by load 505 electrically coupled to output terminals 503a-503b. Controller 502 may receive the sensed values of sensors/sensor interfaces 5a-5d and/or output sensor(s)/sensor interface(s) 504. In some embodiments, controller 502 may switch, or control, switches 5Sa-5Sd and may cause input terminals 501a-501h to be electrically coupled in series so that the voltages of input terminals 501a-501h will be added to each other: $V_{tot}=V_{501a-b}+V_{501c-d}+V_{501e-f}+V_{501g-h}=V_{503a-b}$.

Figure 5B:
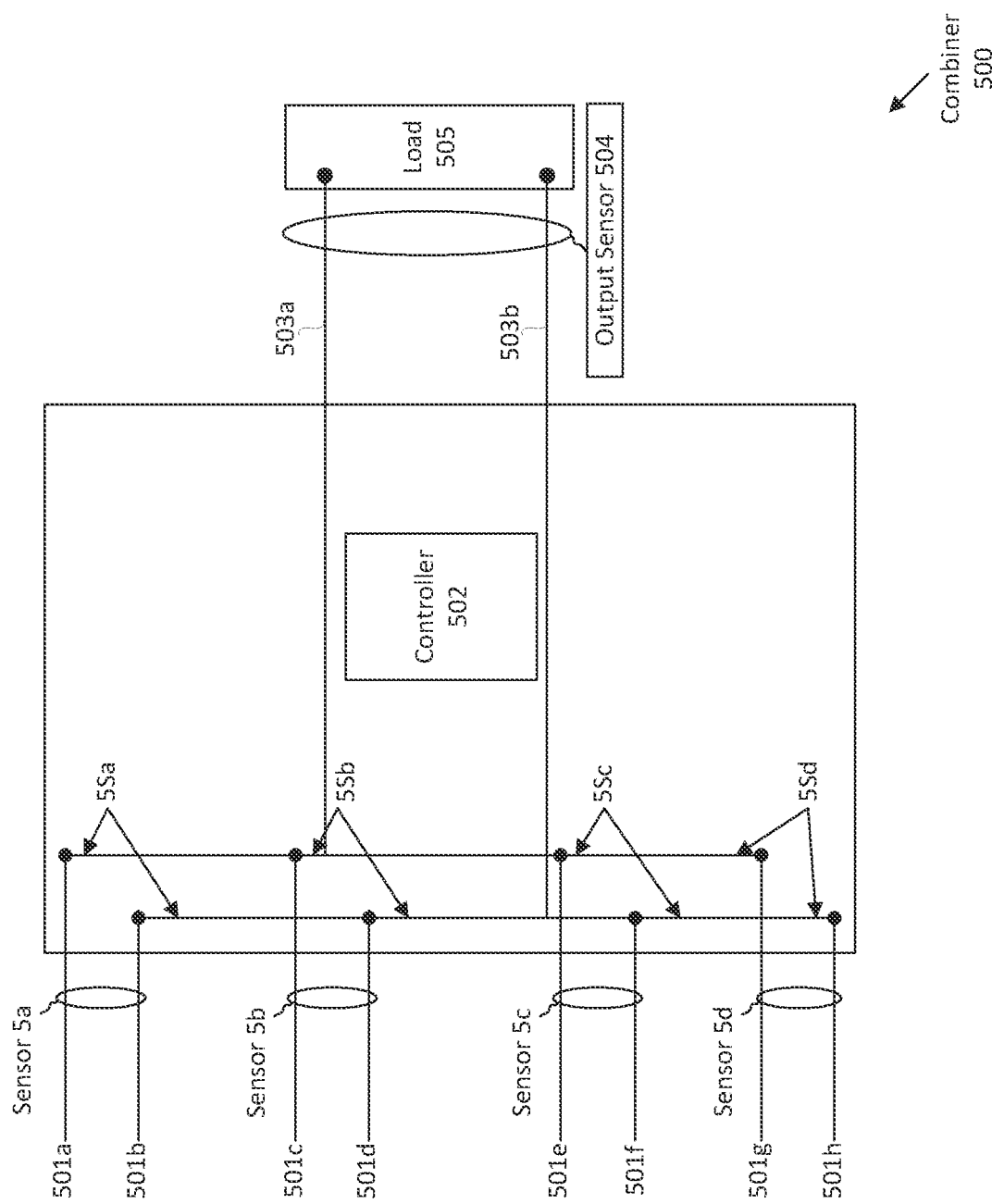
FIG. 5B is a part schematic, part block-diagram, of an example combiner and its input terminals electrically coupled in a parallel configuration, according to various aspects of the present disclosure.

Reference is now made to FIG. 5B, which shows combiner 500 in a second mode of operation according to illustrative embodiments. Sensors/sensor interfaces 5a-5d may sense a voltage value on input terminals 501a-501h. Output sensor(s)/sensor interface(s) 504 may sense the differential voltage of output terminals 503a-503b. Controller 502 may receive the values sensed by sensors/sensor interfaces 5a-5d and output sensor(s)/sensor 504. The voltage between output terminals 503a-503b may be a voltage determined by load 505, e.g., a voltage of 700V or any other voltage. In some embodiments, the voltage may be sensed at each one of pairs of input terminals 501a-501d (which again may be, e.g., 700V or any other voltage). Controller 502 may switch switches 5Sa-5Sd at input terminals 501a-501h to electrically couple input terminals 501a-501h in parallel. When electrically coupling input terminals 501a-501h in parallel, a common voltage may be applied between each pair of input terminals, and a combined current (i.e. the sum of the currents flowing through input terminals 501a-501d) may be transferred to output terminals 503a-503b.

Figure 5C:
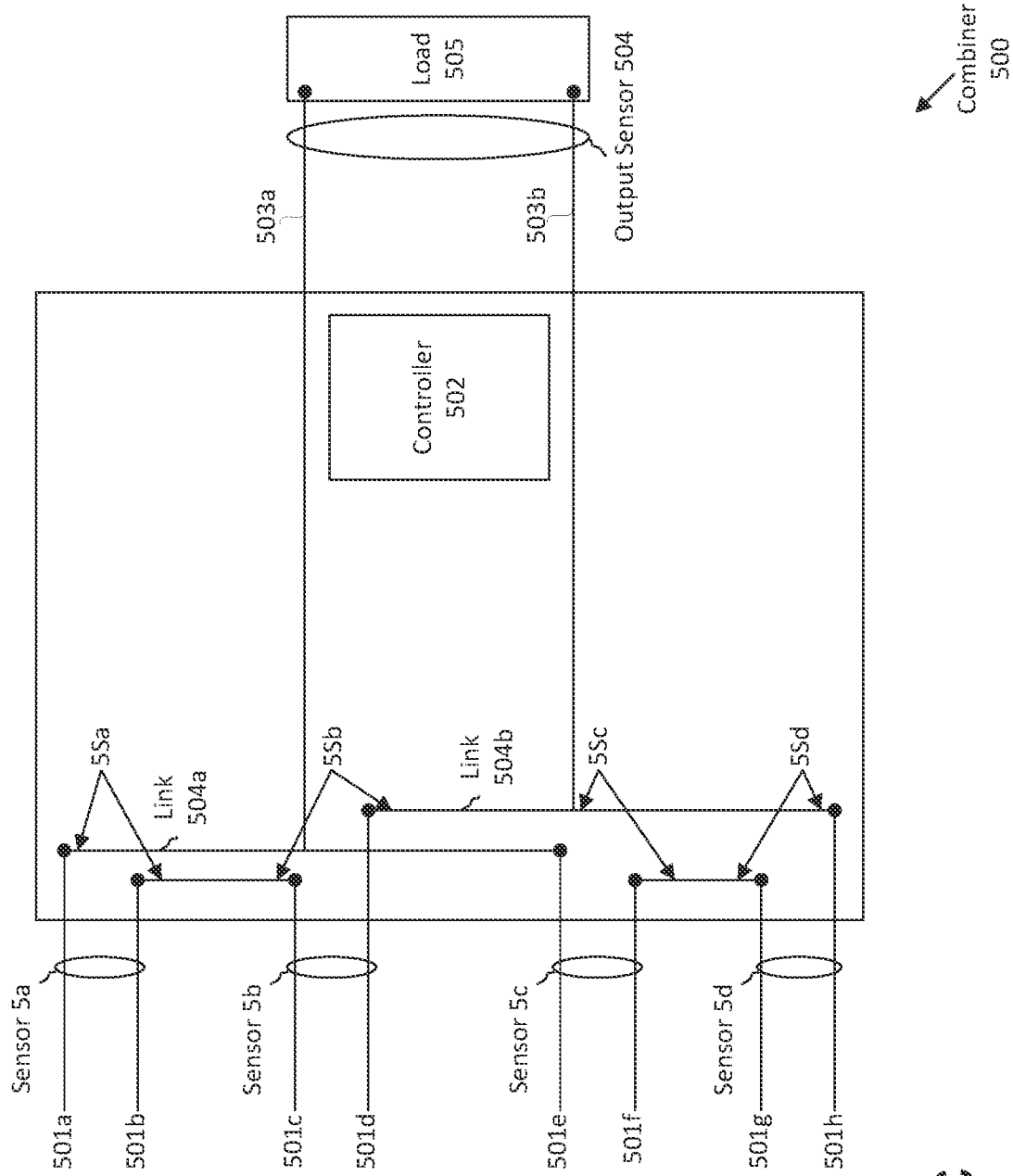
FIG. 5C is a part schematic, part block-diagram, of an example combiner and its input terminals electrically coupled in a combination of both parallel and series configurations, according to various aspects of the present disclosure.

Reference is now made to FIG. 5C, which shows combiner 500 in a third mode of operation according to illustrative embodiments. In some cases, the voltage and current values on input terminals 501a-501h and output terminals 503a-503b may vary. For example, output sensor(s)/sensor interface(s) 504 may sense that the output voltage on output terminals 503a-503b is 700V. Sensor(s)/sensor interface(s) 5a may sense that the voltage on input terminals 501a-501b is 300V, while sensor(s)/sensor interface(s) 5b may sense that the voltage on input terminals 501c-501d is 500V. Sensor(s)/sensor interface(s) 5c may sense that the voltage on input terminals 501e-501f is 500V, while sensor(s)/sensor interface(s) 5d may sense that the voltage on input terminals 501g-501h may be 300V. In this example, controller 502 may receive the values sensed by sensors/sensor interfaces 5a-5d, and accordingly may electrically couple pairs of input terminals 501a-501b and 501c-501d in a series configuration and electrically couple pairs of input terminals 501e-501f and 501g-501h in a series configuration creating two points with a differential voltage between them of 700V in this example. As well as electrically coupling two pairs of input terminals in series, controller 502 may electrically couple input terminals in a parallel configuration, using electrical links 504a and 504b with a voltage of 700V where input terminals 501a and 501e may be coupled to electrical link 504a, and input terminals 501d and 501h may be coupled to electrical link 504b. Output terminals 503a-503b may be electrically coupled to links 504a-504b. Controller 502 may electrically couple, in series, pairs of input terminals 501a-501b and 501e-501f, as well as electrically couple, in series, pairs of input terminals 501c-501d and 501g-501h (not shown). After electrically coupling pairs of input terminals 501a-501b and 501c-501d in series and pairs of input terminals 501e-501f and 501g-501h in series, controller 502 may electrically couple the two sets of pairs of input terminals in parallel. By electrically coupling pairs of input terminals 501a-501b and 501c-501d in series, and pairs of input terminals 501e-501f and 501g-501h in series, controller 502 may create a balanced voltage between output terminals 503a-503b and input terminals 501a-501h according to output sensor(s)/sensor interface(s) 504 in combiner 500.

Figure 5D:
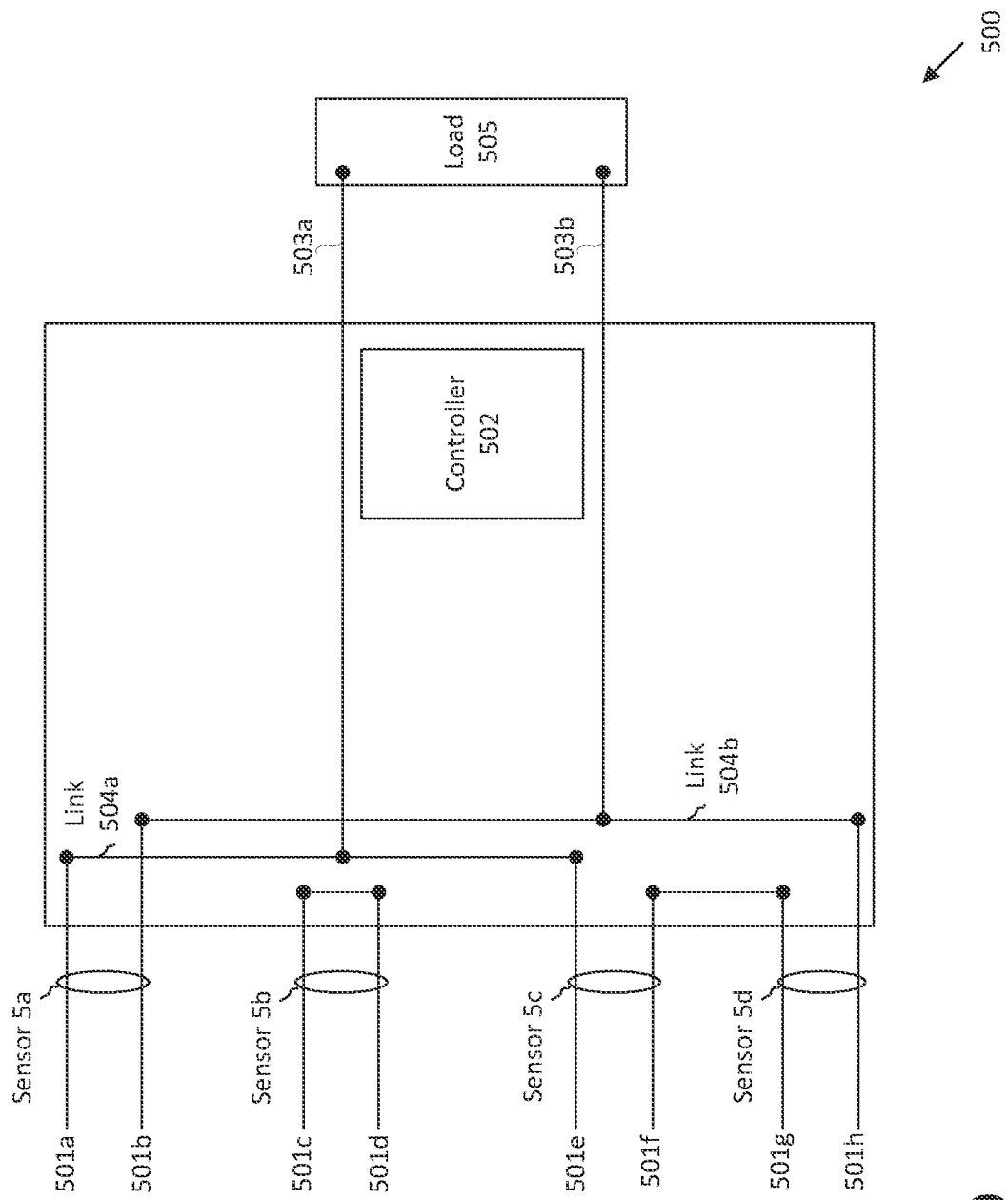
FIG. 5D is a part schematic, part block-diagram, of an example combiner and its input terminals electrically coupled in a combination of both parallel and series configuration as well as a shorted pair of input terminals, according to various aspects of the present disclosure.

Reference is now made to FIG. 5D, which shows combiner 500 in a fourth mode of operation according to illustrative embodiments. In some cases the voltage and/or current at input terminals 501a-501b may be different than the voltage and/or current at input terminals 501c-501d, 501e-501f and/or 501g-501h. When trying to draw the maximum amount of power from input terminals 501a-501h, controller 503 may couple one or more pairs of input terminals 501a-501h in series, one or more pairs of input terminals 501a-501h in parallel, and in some cases controller 503 may couple inputs 501a-501h in a combined configuration (some pairs of the input terminals in series and some pairs of the input terminals in parallel), such as the configuration shown in FIG. 5D. Under certain conditions, one or more input terminals 501a-501h may be more harmful than useful with regard to the amount of power combiner 500 may transfer from input terminals 501a-501h to output terminals 503a-503b. For example, sensor(s)/sensor interface(s) 5a may sense a voltage value of 400V and current value of 10A at input terminals 501a-501b. Sensor(s)/sensor interface(s) 5b may a sense a voltage value of 10V and current value of 2A at input terminals 501c-501d. Sensor(s)/sensor interface(s) 5c may sense a voltage value of 150V and a current value of 20A at input terminals 501e-501f. Sensor(s)/sensor interface(s) 5d may sense a voltage value of 250V and a current value of 20A at input terminals 501g-501h. It should be noted that all voltage and current values mentioned throughout this document are merely examples, and any other voltage and current values may be used or measured in any of the embodiments. Controller 502 may be configured to maximize the amount of power extracted from input terminals 501a-501g and therefore may switch the switches at input terminals 501a-501h as follows: input terminals 501e-501f and 501g-501h may be electrically coupled in series, input terminals 501a-501b may be electrically coupled in parallel to the series configuration of input terminals 501e-501h, and input terminals 501c-501d may be shorted together. In this configuration, input terminals 501a-501h may transfer power to output terminals 503a-503b with a value of: $V_{tot}=V_{501a-b}\|(V_{501e-f}+V_{501g-h})=$ 400V and $I_{tot}=I_{501a}+(I_{501g}=I_{501e})=30$A (for example), which gives the power value of: $P_{503a-b}=V_{tot}\times I_{tot}=12,000$ W (for example). In some embodiments, combiner 500 may be placed as part of a power system. One or more power generators may be coupled to combiner 500 at one or more input terminals 501a-501h. Output terminals 503a-503b may be electrically coupled to load 505, which in some embodiments, may be a power converter connected to a grid, a storage device, an electrical vehicle, etc. Load 505 coupled to output terminals 503a-503b may determine the voltage of output terminals 503a-503b. The voltage of output terminals 503a-503b may determine the voltage on links 504a-504b which may determine the voltage on input terminals 501a-501h. Coupled to input terminals 501a-501h may be power generators (shown in FIGS. 1-3), which may have a preferred operating point, such as a preferred voltage or current which may supply more power to input terminals 501a-501h rather than a different operating point which may supply less power to input terminals 501a-501e. One way for controller 502 to electrically couple input terminals 501a-501d in a more efficient way with regard to setting a more efficient operating point on input terminals 501a-501d is to check, learn, and/or otherwise determine what an effective operating point (e.g., the most effective operating point) of each power generator coupled to input terminals 501a-501h is. In some embodiments, coupled to outputs 503a-503b may be a power device configured to perform power point tracking, which may comprise tracking the operating point of the power flowing from input terminals 501a-501h through combiner 500 and out of output terminals 503a-503b. Controller 502 may determine (e.g., "learn") what is a preferred (e.g., most effective) operating point for each power generator coupled to input terminals 501a-501d by electrically coupling one pair of input terminals 501a-501h at a time to output terminals 503a-503b and shorting or disconnecting the other input terminals while doing so. For each pair of pairs of input terminals 501a-501h that is electrically coupled to output terminals 503a-503b, the power device electrically coupled to output terminals 503a-503b may determine (e.g. search for) a preferred operating point. The search may be done by selecting a group of voltages between 0V and $V_{oc}$, applying each voltage in the group to the output terminals and sensing the output current corresponding to the applied voltage, and calculating the amount of power generated by the applied voltage and the sensed current flowing from the pair of input terminals of input terminals 501a-501h coupled to output terminals 503a-503b. The preferred operating point may be selected to correspond to the voltage that outputs the most power. The preferred operating point found of the coupled pair of input terminals 501a-501h to outputs 503a-503b may be saved by controller 502.

In some embodiments (e.g., as shown in FIG. 2 and FIG. 3), one or more power devices may be electrically coupled to one or more of input terminals 501a-501h. Power devices coupled to input terminals 501a-501h may apply power point tracking to power generators to increase (e.g., maximize) power harvesting of the power generators. In some embodiments, power devices may convert power from a first voltage and first current level to a second voltage and second current level. Converting power from a first voltage and first current level to a second voltage and second current level may be carried out at an efficiency rate that may depend on the conversion ratio of the voltage level. Controller 502 may electrically couple one or more input terminals of input terminals 501a-501h in series, parallel, or a combined configuration of series and parallel. The configuration chosen by controller 502 may be based on the efficiency at different conversion ratios of power devices coupled to input terminals 501a-501h.

In some embodiments, output terminals 503a-503b might not be connected to a load and/or might not have a set voltage level between them. One or more of input terminals 501a-501h may be electrically coupled to one or more power generators that may create a voltage across each pair of input terminals 501a-501h. Sensors 5a-5d may sense a differential voltage on pairs of input terminals 501a-501h and provide the sensed value to controller 502. Output terminals 503a-503b may be coupled to input terminals 501a-501h. Controller 502 may be configured to limit and/or reduce the voltage across output terminals 503a-503b, for example, to comply with a regulatory maximum output voltage. For example, upon detecting an output voltage above an allowed limit or above a preferred operating point, controller 502 may reduce the voltage across output terminals 503a-503b by electrically coupling some or all of input terminals 501a-501h in parallel, which may reduce the number of serially-connected power generators coupled to input terminals 501a-501h. In another example, the controller 502 may short one or more power generators coupled to input terminals 501a-501h, which may prevent the rising of the voltage on output terminals 503a-503b.

In some embodiments, controller 502 may be configured to limit the voltage on input terminals 501a-501h. For example, controller 502 may be configured to limit the total voltage across each pair of input terminals 501a-501h to under a threshold, for example, 500V. For example, input terminals 501a-501b may have a voltage differential of 300V and input terminals 501c-501d may have a differential of 400V and may be connected in series to input terminals 501a-501b (e.g. as shown in FIG. 5A). Controller 502 may switch switches 5Sa-5Sd, which may electrically couple pairs of input terminals 501a-501b and 501c-501d in parallel (forcing pairs of input terminals 501a-501b and 501c-501d to have a common voltage, which may change associated power generators' operating points), or may short either pair of input terminals 501a-501b or pair of input terminals 501c-501d to reduce the total voltage drop across input terminals 501a-501d.

Figure 5E:
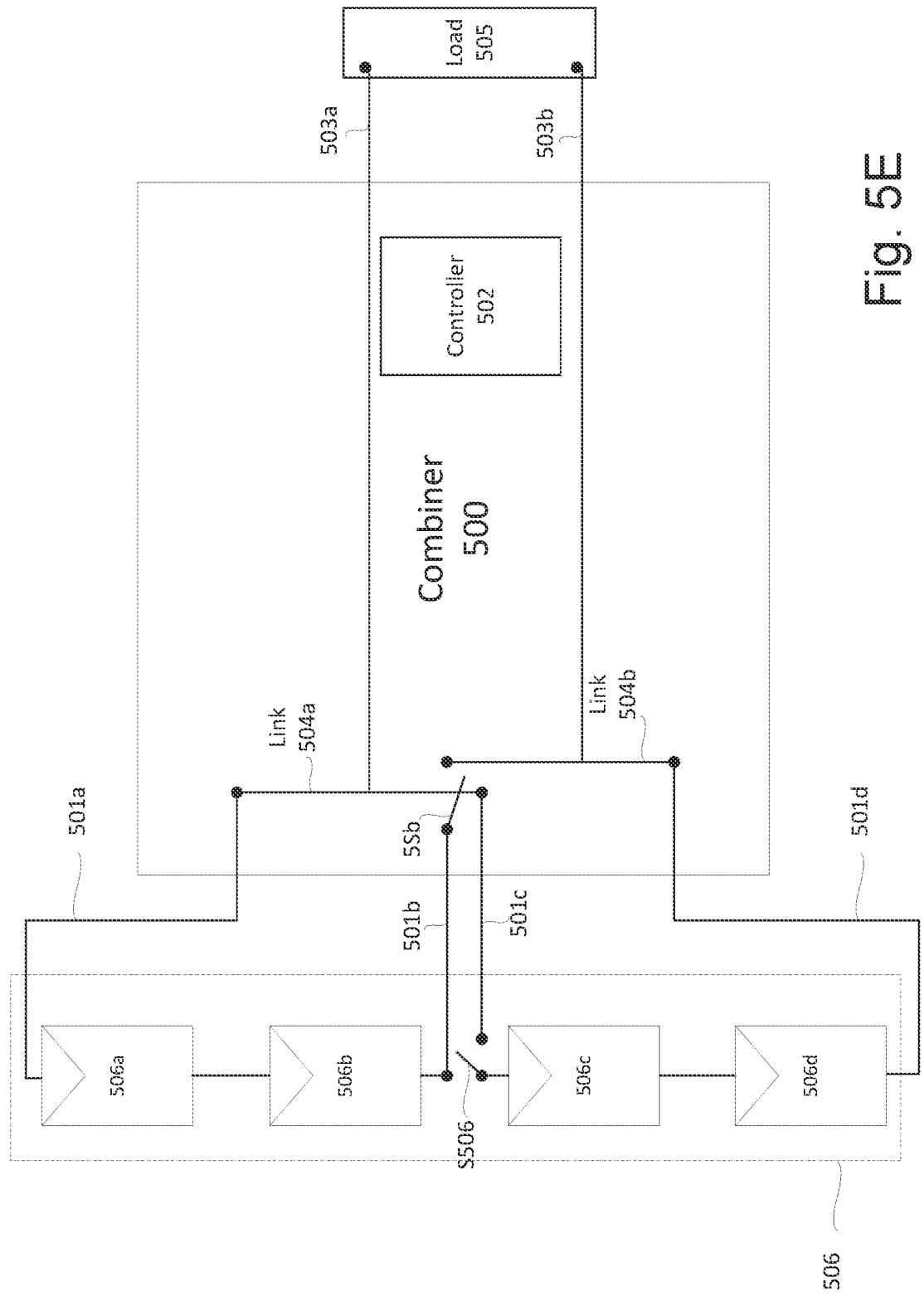
FIG. 5E is a part schematic, part block diagram, of an example combiner and its input terminals coupled to a power generator where the input terminals are coupled in a configuration set to divide the power generator in to more than one string, according to various aspects of the present disclosure.

Reference is now made to FIG. 5E, which shows combiner 500 coupled to power generator 506 according to illustrative embodiments. Power generator 506 may comprise PV panels 506a-506d. PV panels 506a-506d may be electrically coupled, for example, in series. In some embodiments, the connection between PV panels 506b and 506c may comprise switch S506. Power generator 506 may be electrically coupled to combiner 500 at input terminals 501a and 501d. Power generator 506 may comprise outputs coupled to input terminal 501b and 501c. Switch S506 may be configured to electrically couple PV panel 506b to PV panel 506c, or electrically couple PV panel 506c to input terminal 501c. Switch 5Sb may be configured to electrically couple input terminal 501b to power link 504a or uncouple input terminal 501b from power link 504a. In some embodiments, controller 502 may be configured to limit the differential voltage between two points in a power generator. One way to limit the differential voltage on a power generator string of PV panels is to divide the string (e.g. by controller 502 operating one or more switches) into more than one part. For example, PV panels 506a-506d of PV generator 506 may each be under a differential voltage of 50V, and an entire string may have a differential voltage string of 200V. Controller 502 may be configured to limit the voltage of any power generator to 150V, and controller 502 may switch switches S506 and 5Sb so that PV panel 506b is electrically coupled to power link 504b and uncoupled from PV panel 506c, as well as electrically coupling PV panel 506c to link 504a through input terminal 501c in such a way that the string of panels may be divided into two separate strings parallel to each other. Another way to limit the voltage is to bypass one of the different sections of the power generator string, for example by shorting input terminals 501c and 501d, as well as electrically coupling input terminal 501b to power link 504b.

Figure 5F:
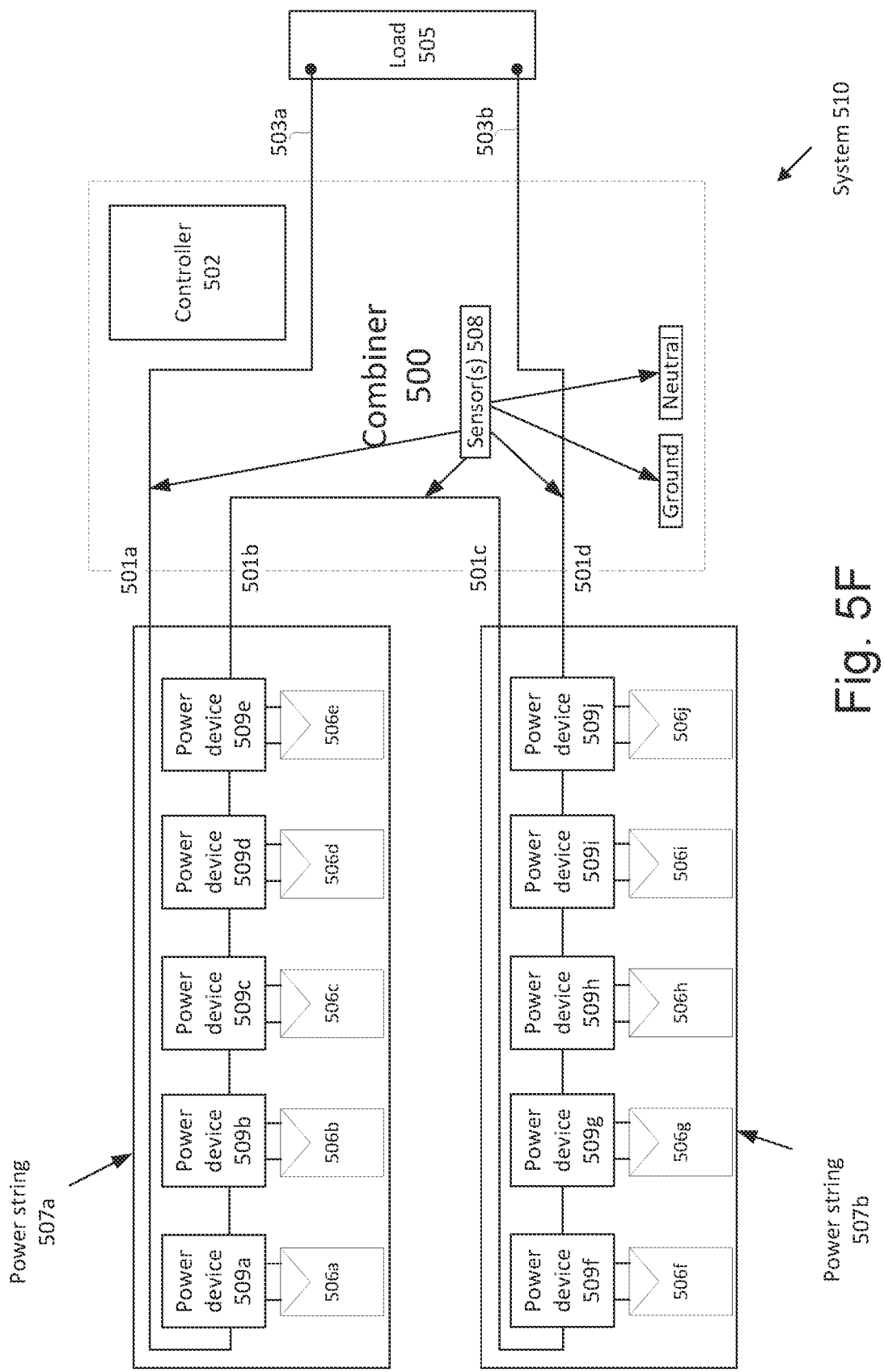
FIG. 5F is a block diagram of an example power system including a power string, combiner and a load, according to various aspects of the present disclosure.

Reference is now made to FIG. 5F, which shows a power system 510 according to illustrative embodiments. Power system 510 may comprise combiner 500, power strings 507a-507b and load 505. Combiner 500 may be electrically coupled to power strings 507a-507b at input terminals 501a-501d, and may be electrically coupled to load 505 at output terminals 503a-503b. In some embodiments, power strings 507a-507b may include a string of power generators 506a-506j where one or more of power generators 506a-506j in the string is coupled to a power device 509a-509j. Power devices 509a-509j may be the same or similar to power devices 202a-202n of FIG. 2. For example, power string 507a may include power generators 506a-506e where each power generator of power generators 506a-506e is coupled to a power device of power devices 509a-509e. Power devices 509a-509j may be configured to bypass and/or adjust the voltage and/or current to a coupled power generator of power generators 506a-506j. Bypassing a power generator of power generators 506a-506j may include short-circuiting the output terminals of one of power devices 509a-509j coupled to the power generator of power generators 506a-506j, and/or disconnecting the input terminals of the power device of power devices 509a-509j connected to a respective power generator of power generators 506a-506j.

Combiner 500 may include sensor(s) 508. Sensor(s) 508 may be configured to measure values of electrical parameters and/or physical parameters on input terminals 501a-501d. Electrical parameters may include voltage, current, power, etc., and physical parameters may include pressure, temperature humidity, etc. Controller 502 may be configured to receive the measured values from sensor(s) 508. According to the measured values measured by sensor(s) 508, controller 502 may signal one or more of power devices 509a-509j to bypass and/or adjust the voltage and/or current on the corresponding power generators of power generators 506a-506j coupled to the one or more of power devices 509a-509j. Signaling one or more of power devices 509a-509j may include sending a "disable" or "adjust" signal or may include stop sending a "keep alive" signal, where the one or more of power devices 509a-509j are configured to disable or adjust the voltage and/or current on the power generators after not receiving a "keep alive" signal for a period of time (e.g., 1 second, 5 seconds, 10 seconds). In some embodiments, controller 502 may be configured to transmit the measured values sensed by sensor(s) 508 to load 505, and load 505 may be configured to signal a disable and/or adjust signal, or stop sending a "keep alive" signal to one or more of power devices 506a-506j. The signal to power devices 509a-509j may be transmitted using, for example, a wireless communication device, a power line communications (PLC) device, an acoustic communication device and/or a designated communication line.

Sensor 508 may be configured to measure values of electrical and/or physical parameters on any of input terminals 501a-501d with relation to one or more reference points. For example, sensor 508 may measure a voltage between a first input terminal (e.g., 501a) and a second input terminal (e.g., 501b or 501d), a first input terminal (e.g., 501a) compared to a ground or neutral reference point. In some embodiments, controller 502 may receive more than one measurement from sensor(s) 508 and may compute a sum or average value of the measurements. In some embodiments controller 502 may be configured to signal one or more of power devices 509a-509j in a scenario where one or more of the measurements sensed by sensor(s) 508 is higher or lower than a computed average by more than a certain threshold, and/or if a difference between two measurements is more than a certain threshold. In some embodiments, sensor(s) 508 may measure temperature at a plurality of points, and in a case where on or more of the temperatures is over a set temperature, controller 502 may be configured to signal power devices 509a-509j to disable or adjust/limit the voltage and/or current on power generators 506a-506j.

Figure 6:
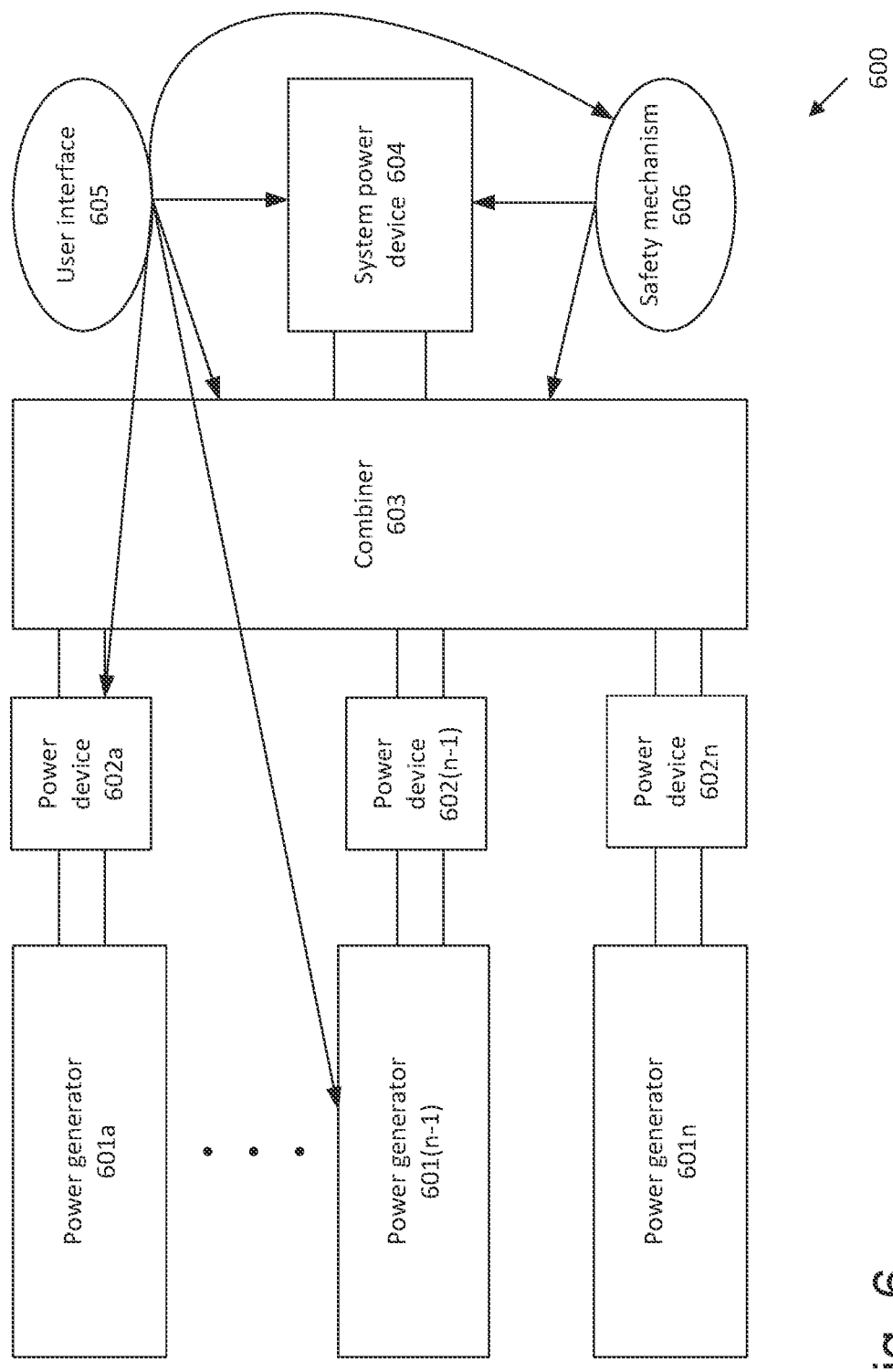
FIG. 6 is a part schematic, part block-diagram, of an example power system configuration including a user interface and a safety mechanism, according to various aspects of the present disclosure.

Reference is now made to FIG. 6, which shows a power system 600 according to illustrative embodiments. Power system 600 may comprise power generators 601a-601n, power devices 602a-602n which may perform PPT on one or more of power generators 601a-601n, combiner 603 which may be the same or similar to combiner 500 of FIGS. 5A-5AD, and system power device 604 which may be configured to connect to the grid. In some embodiments, power system 600 may comprise a safety mechanism 606. Safety mechanism 606 may be integrated in or mounted on system power device 604, or may be a standalone mechanism. Safety mechanism 606 may be triggered automatically, for example when a voltage level in combiner 500 is above a threshold level, or when a current or currents sensed by sensors/sensor interfaces 5a-5d are different from the current sensed by output sensor(s)/sensor interface(s) 504. This difference in current may indicate that there is a leakage in combiner 500. In some embodiments, safety mechanism 606 may comprise a mechanical switch designed to be manually activated, and which may cause power generators to be disconnected from combiner 500. When the mechanical switch is activated, safety mechanism 606 may be switched from a "regular mode" where combiner 500 is transferring power from input terminals 501a-501d to output terminals 503a-50b, to a "safe mode" where combiner 500 does not transfer power from input terminals 501a-501d to output terminals 503a-503b. For example, the mechanical switch may be activated when there is a fire, and, because of the fire, it may be desirable to disconnect the power generators from the combiner 500. Safety mechanism 606 may be configured to signal and/or communicate with system power device 604 and/or combiner 603, and may instruct the system power device 604 and/or combiner 603 to enter a safe mode. System power device 604 and/or combiner 603 may comprise a receiving device and/or a communication device configured to receive a signal and/or communicate with safety mechanism 606. A safe mode may include, for example, lowering the voltage input to system power device 604, disconnecting system power device 604 from the grid, and/or disconnecting system power device 604 from combiner 603. The safe mode may be configured to different settings. For example, settings of the safe mode may be configured based on which country the device is located in and/or whether the device is located in an area controlled by safety regulations. In some embodiments, system power device 604 may be configured to signal combiner 603 after receiving a "go into safe mode" signal from safety mechanism 606. Safe mode in power system 600 may include system power device 604 signaling combiner 603 to lower the voltage at combiner's 603 output terminals, to lower the voltage at combiner's 603 input terminals, to lower the current at combiner's 603 output terminals, to lower the current at combiner's 603 input terminals, and/or to disconnect input terminals of combiner 603 and/or output terminals of combiner 603. In some embodiments, safety mechanism 606 may comprise a safety button, a switch, a screen, and/or a voice recognition system. In some embodiments, safety mechanism 606 may comprise an automated system configured to measure certain values such as voltage, current, heat, hermeticity, humidity, etc., and send a "go into safe mode" signal if the measured values are above or beneath a certain threshold. Safety mechanism 606 may transmit signals using a PLC device (or other wired communication device), wireless communication device and/or an acoustic communication device. Safety mechanism 606 may be mounted on or housed in system power device 604, mounted on an accessible wall, part of a user interface on a mobile accessory separate from power system 600, etc.

In some embodiments, power system 600 may cause display of a user interface (UI) 605 on a video display device such as a computer screen of a computer that is part of, or communicatively coupled with, power system 600. UI 605 may be used to configure various aspects of the power system 600. UI 605 may display monitored values and states of power system 600, such as level of power being harvested from power generators, voltage and current values in system 600, temperature, time, and/or weather forecast etc. UI 605 may use a PLC device (or other wired communication device), wireless communication device and/or an acoustic communication device to receive monitored values from different components of power system 600 such as power generators 601a-601n, power devices 602a-602n, combiner 603, system power device 604 and/or safety mechanism 606. UI 605 may gather monitored data and display the data to a user. In some embodiments, UI 605 may provide the user with a means for controlling power system 600, for example, UI 605 may signal combiner 603 to disconnect one of power generators 601a-601n, go into a safe mode and/or change voltage or current levels.

Although FIG. 6 illustrates power devices 602a-602n as being coupled to the power generators 601a-601n and the combiner 603, in some embodiments, power devices 602a-602n may be integrated in power generators 601a-601n. In some embodiments, there may be more than one power device in one or more power generators 601a-601n. In some embodiments, one or more power devices 602a-602n may be between combiner 603 and system power device 604. In some embodiments, one or more power devices of power devices 602a-602n may be positioned in combiner 603 or may be part of system power device 604.

Figure 7A:
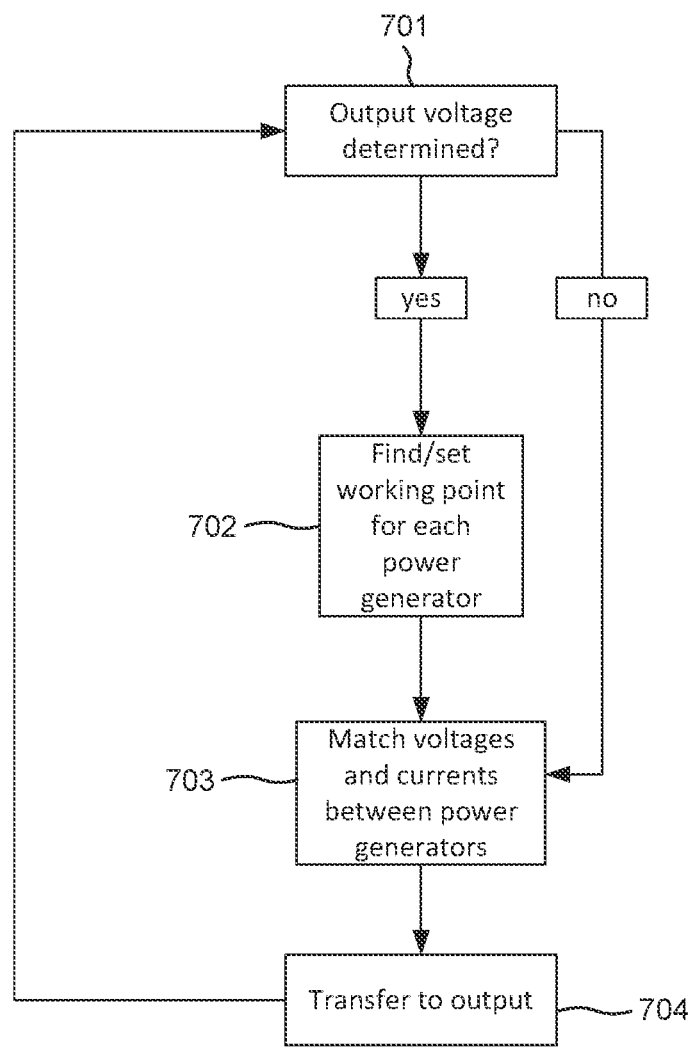
FIG. 7A is a flowchart showing an example method for transferring power from a combiner's input terminals to a combiner's output terminals, according to various aspects of the present disclosure.

Reference is now made to FIG. 7A, which shows a flow chart of a method 700a, which may be used for transferring power from power generators in a power system to an output of a combiner according to illustrative embodiments. Method 700a may be carried out by one or more controllers (e.g., computer processors) that are part of or operatively attached to one or more components of a power system, such as any of the power systems described in this document. For example, method 700a may be carried out with regard to power system 600 comprising combiner 603, power devices 602a-602n and power generators 601a-601n. In step 701 of method 700a, a controller (e.g. coupled to combiner 603) in the power system may check if the output voltage of the combiner is set or determined by a load and/or a power converter coupled to the output terminals of the combiner. If the combiner's output terminals' voltage is determined, in step 702 power devices in the power system may try to find and/or set an operating point for the power generators using a power point tracking method. The power point tracking method for a power generator may comprise using a lookup table where there may be a certain lookup table used for a range of temperatures, and the lookup table may indicate an appropriate current for a given voltage, and/or may indicate an appropriate voltage for a given current. An operating point may be found using impedance matching. An operating point may be found in a dynamic search (e.g. "perturb and observe") where, for example the search for an appropriate operating point at which to operate the corresponding power generator may be changed and the power value before the change and after may be compared. This process of changing voltage and/or current, and measuring the resulting power value, may be repeated until an appropriate operating point is found.

After finding and/or setting operating points for the power generators, the combiner's pairs of input terminals, which may be coupled to the power generators and/or the power devices, may have different values of electrical parameters such as voltage, current and power flowing through them. The values may vary depending on the conversion ratio in the power devices and/or the set voltage or current on the input of the combiner. The controller coupled to the combiner in step 703 may try to match between the different pairs of input terminals, to transfer as much power as possible or as much power as wanted from the pairs of input terminals to the outputs of the combiner.

In an embodiment where the output voltage is not determined by a load, the controller may carry out step 703 without having a desired operating point of the power generators. For example, if the method 700a proceeded from step 701 to step 703 because no output voltage was determined, the controller may carry out step 703 without having a desired operating point of the power generators. After matching the values of the electrical parameters in step 703, the combiner may transfer the power from the pairs of the input terminals of the combiner to the output terminals at step 704. Method 700a may restart after completing step 704. If the power system is shut off or disconnected, method 700a may stop or pause after step 704.

Figure 7B:
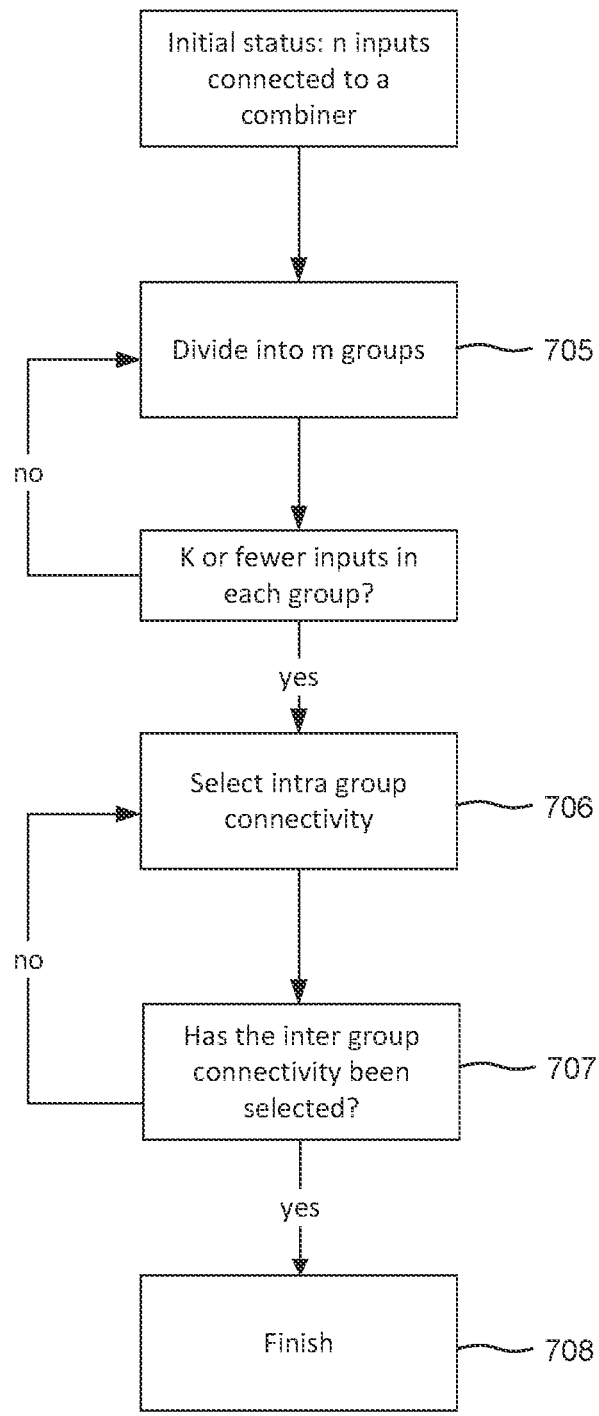
FIG. 7B is a flowchart showing an example method for determining and electrically coupling a combiner's input terminals in a parallel, series or combined configuration, according to various aspects of the present disclosure.

Reference is now made to FIG. 7B which shows a flow chart of a method 700B for switching switches at the combiner's pairs of input terminals and electrically coupling the pairs of the input terminals of the combiner according to illustrative embodiments. Method 700b may be carried out by one or more controllers (e.g., computer processors) similar to or the same as the controller(s) of method 700a, and which may be part of or communicatively coupled with any of the power systems described in this document. Method 700b may be an example of how to perform step 703 of method 700a. The initial status of the power system may have "n" power generators coupled to the combiner. The power generators coupled to the combiner may be different power generators from each other and/or operating under different conditions. In some embodiments, the power system may have one kind of power generators, e.g. photovoltaic panels, which may operate under different and varying conditions (e.g., two PV panels in a single system may receive different levels of solar irradiance, or be cooled by different wind strength). In step 705, the controller may divide the pairs of input terminals of the combiner into "m" number of groups. The division may be according to physical location and/or according to sensed parameter values (voltage, current and power, type of power generator, etc.) at the input terminals. After dividing the pairs of input terminals into "m" groups, the method may include taking each one of the "m" groups and dividing it into "m" sub-groups and so on. Step 705 may end when each group or sub-group has "k" pairs of input terminals or less. When reaching "k" pairs of input terminals in each group or sub-group, at step 706 the controller may select a connectivity configuration and electrically couple the different pairs of input terminals in each one of the sub-groups. The controller may select a parallel, series, or a combined (parallel and series) connectivity configuration and electrically couple the pairs of input terminals according to the configuration. The coupling according to the selected input terminals connectivity configuration may be performed by the controller switching switches at the input terminals of the combiner. After electrically coupling each one of the input terminals in each sub-group, at step 707 the controller may check if the connectivity of the inter-group (i.e. the group of sub-groups) has been selected and executed (e.g., implemented). If the connectivity of the inter group has not been selected and/or executed, the controller may select a connectivity configuration for the inter-group and may electrically couple the sub-groups according to the configuration. If the inter-group connectivity has been selected and/or executed, all connectivity configurations of the input terminals, sub-groups and groups have been selected and electrically coupled, meaning the method 700B has finished at step 708.

Figure 7C:
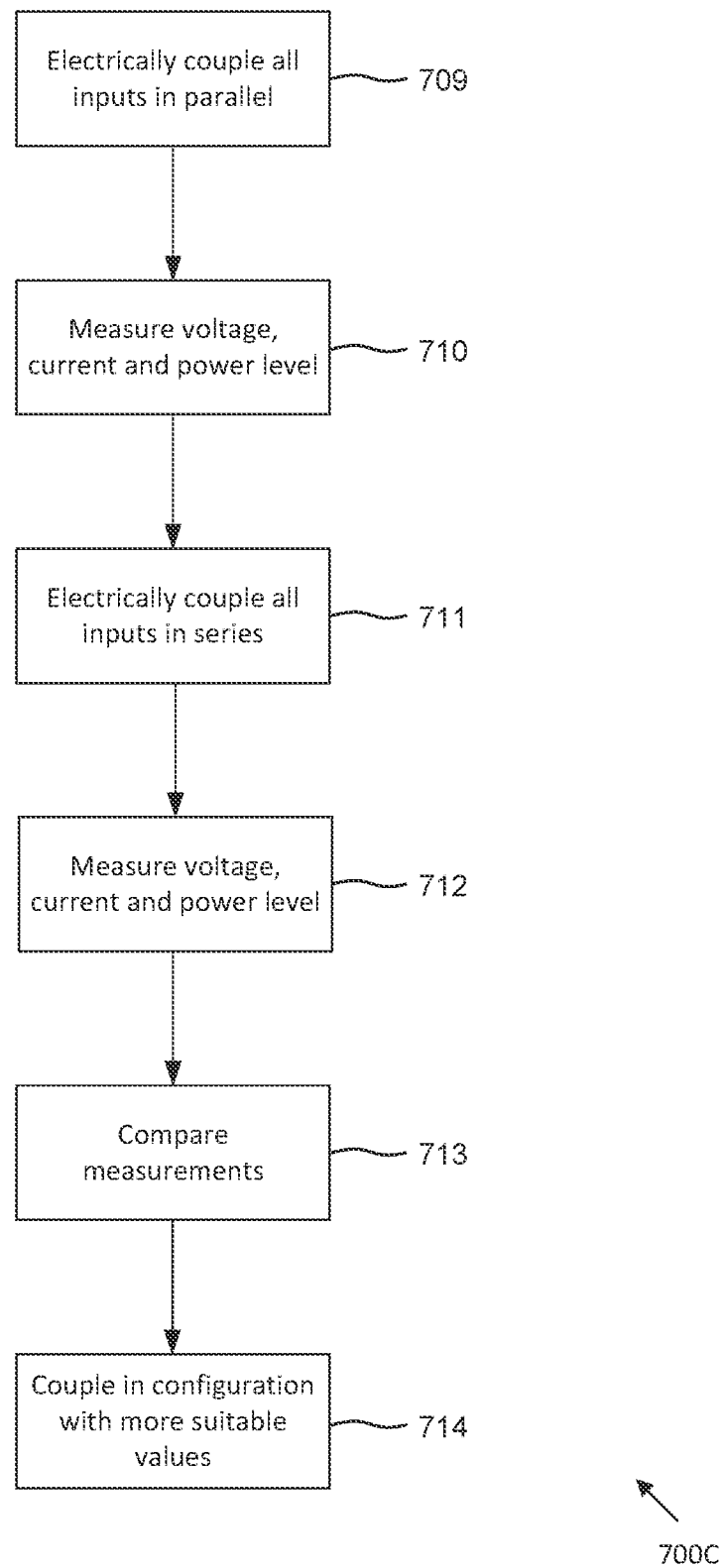
FIG. 7C is a flowchart showing an example method for determining and electrically coupling a sub-group of a combiner's input terminals in a parallel, series or combined configuration, according to various aspects of the present disclosure.

Reference is now made to FIG. 7C, which shows a flow chart of a method 700C for determining a configuration for electrically coupling a group of inputs to a combiner according to illustrative embodiments. Method 700C may be carried out by a controller similar to or the same as the controller of method 700B, which may be configured in the same manner as for the other methods described herein, and which may be implemented in any of the power systems described herein. The controller of method 700C may select a configuration of connectivity between two or more pairs of input terminals, sub-groups or groups of input terminals. A coupling configuration for two or more pairs of input terminals, sub-groups, or groups may be determined according to a comparison between values of electrical parameters such as voltage, current and/or power of each potential configuration. In step 709, the controller may electrically couple (e.g. by operating switches) the different pairs of input terminals, sub-groups or groups in parallel. In step 710 the controller may measure the values of the electrical parameters in the parallel configuration. In step 711, the controller may change the configuration between the pairs of input terminals, sub-groups or groups from parallel to series. After electrically coupling the pairs of input terminals, sub-groups or groups in series, step 712 may comprise measuring electrical parameters of the series configuration. After collecting data and values of measured parameters from both a parallel and a series configuration, at step 713 the values of the electrical parameters between the different configurations may be compared. According to the result of the comparison, the controller may determine, in step 714, how to electrically couple each group of inputs to other groups and to the combiner. For example, the configuration that maximizes power output may be selected.

Referring to methods 700a-700c, while these methods may be carried out in any of the power systems described herein, a particular example for carrying out methods 700a-700c together may also be as follows. A power system may have eight power generators (or any other number of power generators). Each one of the eight power generators may be electrically coupled to a power device configured to perform PPT and find an appropriate operating point for a corresponding power generator. The eight power devices may be electrically coupled to eight pairs of input terminals of a combiner. The combiner may have two outputs coupled to a storage device with a set voltage of, e.g., 400V. The power devices connected to the power generators were able to find an appropriate operating point for each one of the power generators. In this particular example, it will be assumed that the appropriate operating points found and set by the power devices are as follows.

| | Operating point | | |
|---|---|---|---|
| Power generator | Voltage (V) | Current (A) | Power (W) |
| Number 1 | 100 | 10 | 1000 |
| Number 2 | 100 | 10 | 1000 |
| Number 3 | 100 | 10 | 1000 |
| Number 4 | 100 | 10 | 1000 |
| Number 5 | 200 | 5 | 1000 |
| Number 6 | 200 | 5 | 1000 |
| Number 7 | 200 | 5 | 1000 |
| Number 8 | 200 | 5 | 1000 |

The next step after finding and setting the operating points of power generators may be to match power devices according to the voltage and current values of the corresponding power generators. According to method 700b, the initial state may be eight pairs of inputs to the combiner, two from each power device. The controller coupled to the combiner may be configured to divide the eight pairs of input terminals into two groups. The controller may be configured to stop dividing the groups into two when each group or sub-group may have two pairs of input terminals or less. Therefore, the controller may divide the pairs of input terminals into two groups, where each group has two sub-groups of two pairs of input terminals, as shown by way of example below.

| Power generator | Sub-groups | Groups |
|---|---|---|
| Number 1 | Sub-group 1 | Group 1 |
| Number 2 | | |
| Number 3 | Sub-group 2 | |
| Number 4 | | |
| Number 5 | Sub-group 3 | Group 2 |
| Number 6 | | |
| Number 7 | Sub-group 4 | |
| Number 8 | | |

After dividing the pairs of input terminals into groups and sub-groups, the controller may select a connectivity configuration for the sub-groups. In some embodiments, the power devices may convert the power that flows through them. The power devices may have an efficiency rating for each voltage conversion ratio. The controller may try to connect power device such that the power devices operate at a high-efficiency voltage conversion ratio. The controller may couple power generators 1 and 2 in series, power generators 3 and 4 in series, power generators 5 and 6 in parallel and power generators 7 and 8 in parallel. Sub-groups 1-4 may have, for example, the following electrical parameter values:

| Sub-group | Voltage (V) | Current (A) | Power (W) |
|---|---|---|---|
| Sub-group 1 | 100 | 20 | 2000 |
| Sub-group 2 | 100 | 20 | 2000 |
| Sub-group 3 | 100 | 20 | 2000 |
| Sub-group 4 | 100 | 20 | 2000 |

After selecting a connectivity configuration and electrically coupling the sub-groups of power generators, the controller may check if the sub-groups are electrically coupled to each other. The controller may electrically couple sub-groups 1 and 2 in series and sub groups 3 and 4 in series. Groups 1 and 2 may have, for example, the following electrical parameter values:

| Group | Voltage (V) | Current (A) | Power (W) |
|---|---|---|---|
| Group 1 | 200 | 20 | 4000 |
| Group 2 | 200 | 20 | 4000 |

The controller may electrically couple group 1 and group 2 in series bringing the electrical parameters of the combiner inputs to 400V, 20A, and 8000 W, transferable to the combiners output.

In some embodiments, the controller may adjust the conversion ratios of one or more of the power devices in order to find a connectivity configuration suitable for the output voltage, which may be determined by the storage coupled to the output terminals of the combiner.

The invention claimed is:

1. A method comprising:
receiving, by a plurality of input terminals of a combiner, comprising a first pair of input terminals and a second pair of input terminals, power from one or more power devices, wherein each of the one or more power devices comprises a power converter;
determining, while the first pair of input terminals and the second pair of input terminals are connected in parallel, a first power based on a measurement at one or more of the plurality of input terminals;
determining, while the first pair of input terminals is connected in series with the second pair of input terminals, a second power based on a measurement at one or more input terminals of the plurality of input terminals;
comparing the first power with the second power; and
selectively either connecting the first pair of input terminals in series with the second pair of input terminals if the second power is greater than the first power or connecting the first pair of input terminals in parallel with the second pair of input terminals if the first power is greater than the second power.

2. The method of claim 1, further comprising transferring power received via the plurality of input terminals to a plurality of output terminals, wherein the selectively either connecting the first pair of input terminals in series with the second pair of input terminals or connecting the first pair of input terminals in parallel with the second pair of input terminals is also based on a voltage across a load connected to the plurality of output terminals.

3. The method of claim 1, further comprising:
receiving, via the plurality of input terminals, power from a plurality of power sources;
transferring power received via the plurality of input terminals to a plurality of output terminals; and
setting, based on a voltage across a load connected to the plurality of output terminals, an output operating point for each of the plurality of power sources.

4. An apparatus comprising:
a combiner comprising
a plurality of input terminals configured to receive power from one or more power devices, wherein the plurality of input terminals comprise a first pair of input terminals and a second pair of input terminals; and
a controller configured to:
determine, while the first pair of input terminals is connected in parallel with the second pair of input terminals and based on a measurement at one or more of the plurality of input terminals, a first power;
determine, while the first pair of input terminals is connected in series with the second pair of input terminals and based on a measurement at one or more of the plurality of input terminals, a second power;
compare the first power with the second power; and
selectively either cause the first pair of input terminals to be connected in series with the second pair of input terminals if the second power is greater than the first power or cause the first pair of input terminals to be connected in parallel with the second pair of input terminals if the first power is greater than the second power.

5. The apparatus of claim 4, further comprising a plurality of switches, wherein the controller is configured to use the plurality of switches to selectively either cause the first pair of input terminals to be connected in series with the second pair of input terminals or cause the first pair of input terminals to be connected in parallel with the second pair of input terminals.

6. The apparatus of claim 4, further comprising at least one sensor, wherein the controller is configured to measure, using the at least one sensor, a first electrical parameter while the first pair of input terminals is connected in parallel with the second pair of input terminals and a second electrical parameter while the first pair of input terminals is connected in series with the second pair of input terminals.

7. The apparatus of claim 4, wherein:
the combiner further comprises a plurality of output terminals;
the controller is further configured to measure a voltage of the plurality of output terminals;
the voltage is a voltage across a load connected to the plurality of output terminals; and
the controller is further configured to selectively either cause the first pair of input terminals to be connected in series with the second pair of input terminals or cause the first pair of input terminals to be connected in parallel with the second pair of input terminals based further on the voltage.

8. The apparatus of claim 4, wherein:
the combiner further comprises a plurality of output terminals;
the controller is further configured to measure a voltage of the plurality of output terminals; and the controller is further configured to set, based on the voltage, an operating point of each of a plurality of power sources coupled to the plurality of input terminals.

9. The apparatus of claim 4, wherein the controller comprises at least one of a microcontroller unit (MCU), a digital signal processor (DSP), a field-programmable gate array (FPGA), an application-specific integrated circuit (ASIC), or an analog control circuit.

10. The apparatus of claim 4, wherein the controller comprises:
    memory storing instructions; and
    one or more processors configured to execute the instructions.

* * * * *